United States Patent
Yamamoto

(10) Patent No.: US 8,649,002 B2
(45) Date of Patent: Feb. 11, 2014

(54) IMAGING SYSTEM

(75) Inventor: Yusuke Yamamoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 53 days.

(21) Appl. No.: 13/221,484

(22) Filed: Aug. 30, 2011

(65) Prior Publication Data

US 2012/0050727 A1 Mar. 1, 2012

(30) Foreign Application Priority Data

Sep. 1, 2010 (JP) ................................. 2010-195974

(51) Int. Cl.
*G01N 21/00* (2006.01)
(52) U.S. Cl.
USPC .......................................... 356/72
(58) Field of Classification Search
USPC .......................................... 356/72
See application file for complete search history.

(56) References Cited

U.S. PATENT DOCUMENTS

2003/0147110 A1* 8/2003 Barton et al. ............. 358/509

FOREIGN PATENT DOCUMENTS

JP 2008-209627 A 9/2008

OTHER PUBLICATIONS

K. Ietomi et al.: "Experimenta evaluation of Color image estimation method using multipoint spectrum measurements", Tokyo Institute of Technology, Imaging Science and Engineering Laboratory, Proceedings of the 54th Spring Meeting, JSAP and Related Sosieties, 2007 Spring.

\* cited by examiner

*Primary Examiner* — Tarifur Chowdhury
*Assistant Examiner* — Abdullahi Nur
(74) *Attorney, Agent, or Firm* — Westerman, Hattori, Daniels & Adrian, LLP

(57) ABSTRACT

An imaging system may include an optical system that forms an image of light irradiated onto a sample in a predetermined focal plane, an imaging element that includes a pixel array in which a plurality of pixels are arranged in a two-dimensional matrix, each of the pixels detecting at least a part of the light of the image of the sample formed in the focal plane, the imaging element obtaining the image of the sample corresponding to the light detected by the pixel array, a spectrum detecting unit arranged to be adjacent to the pixel array, the spectrum detecting unit detecting a spectrum of the light in the focal plane to output spectrum information, and a correcting unit that corrects the image of the sample obtained by the imaging element based on the spectrum information output from the spectrum detecting unit.

4 Claims, 29 Drawing Sheets

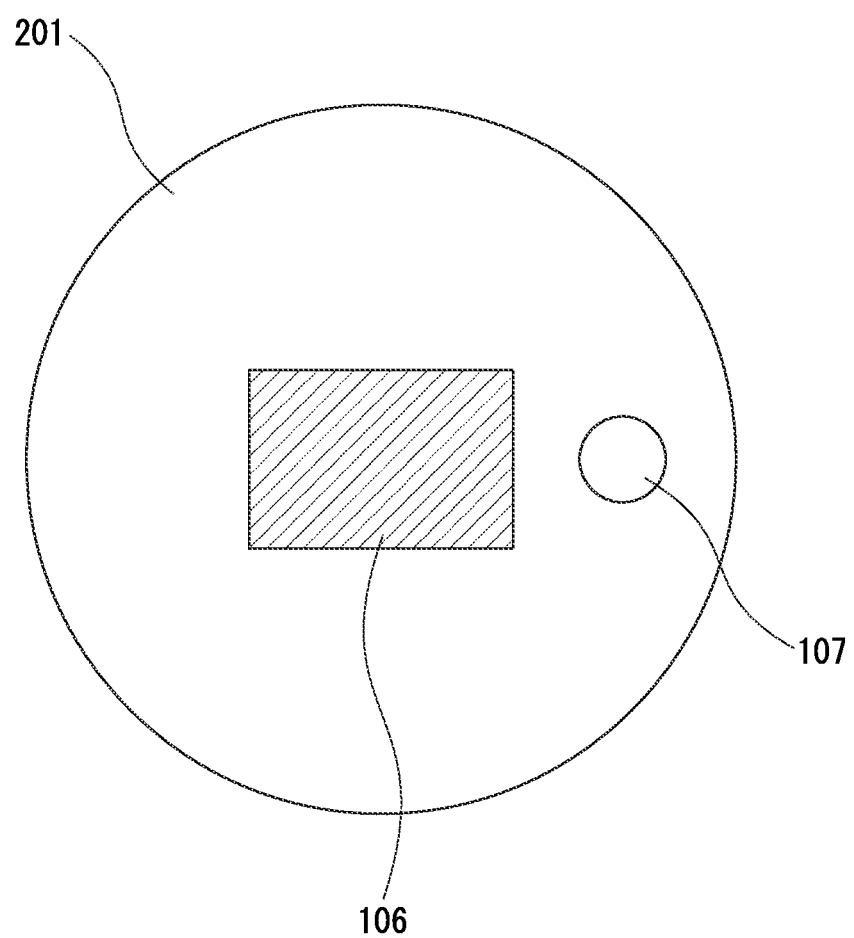

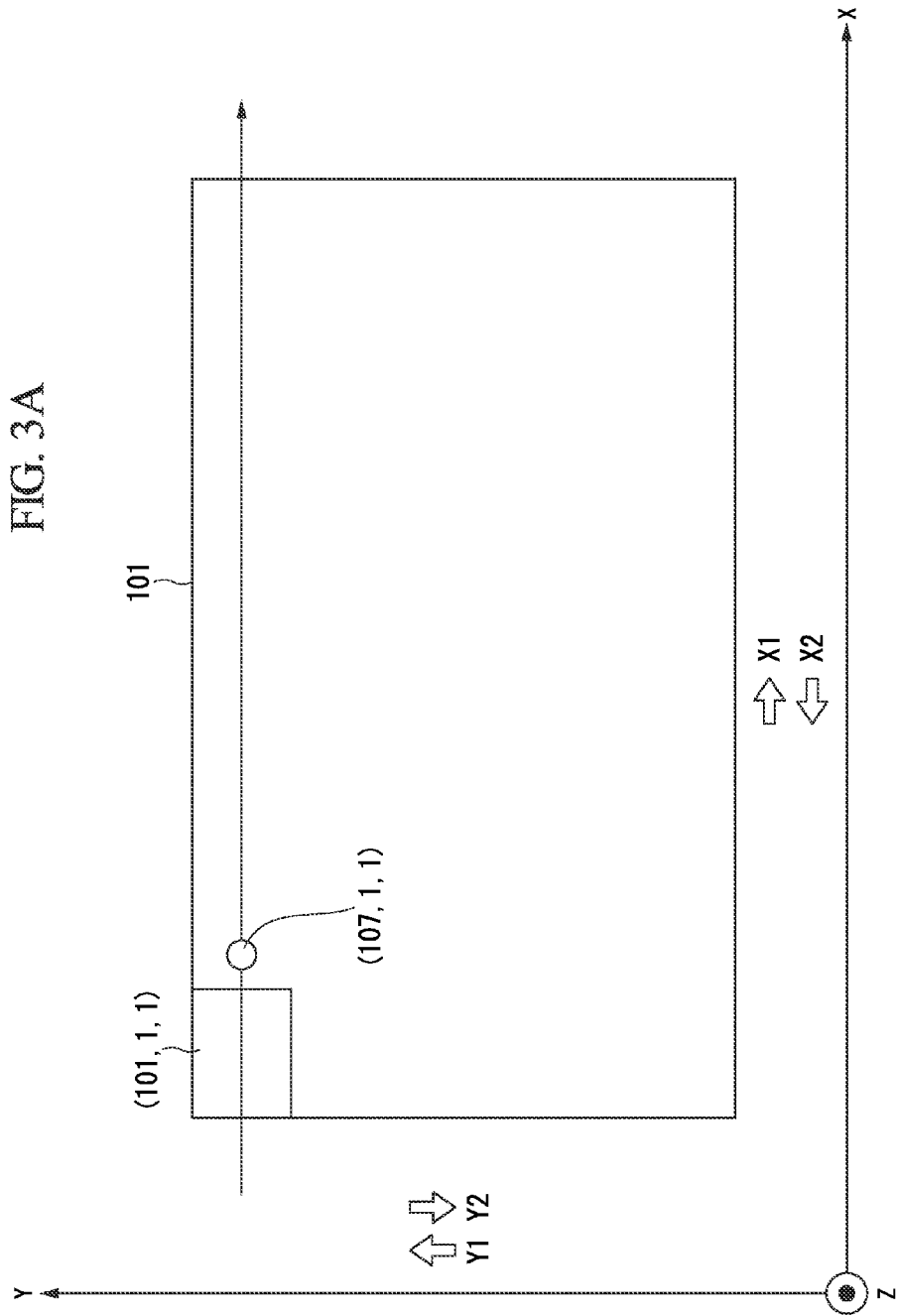

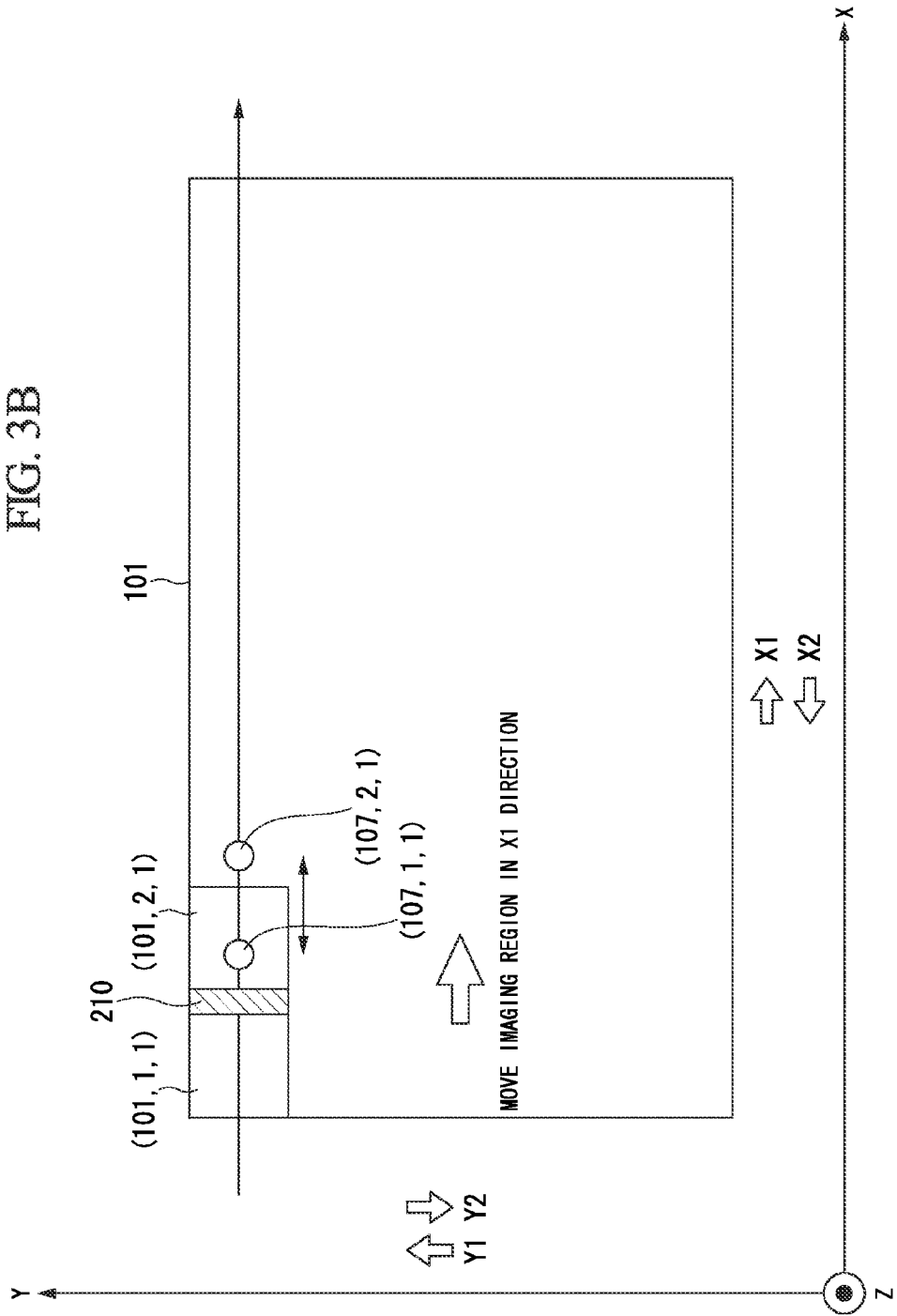

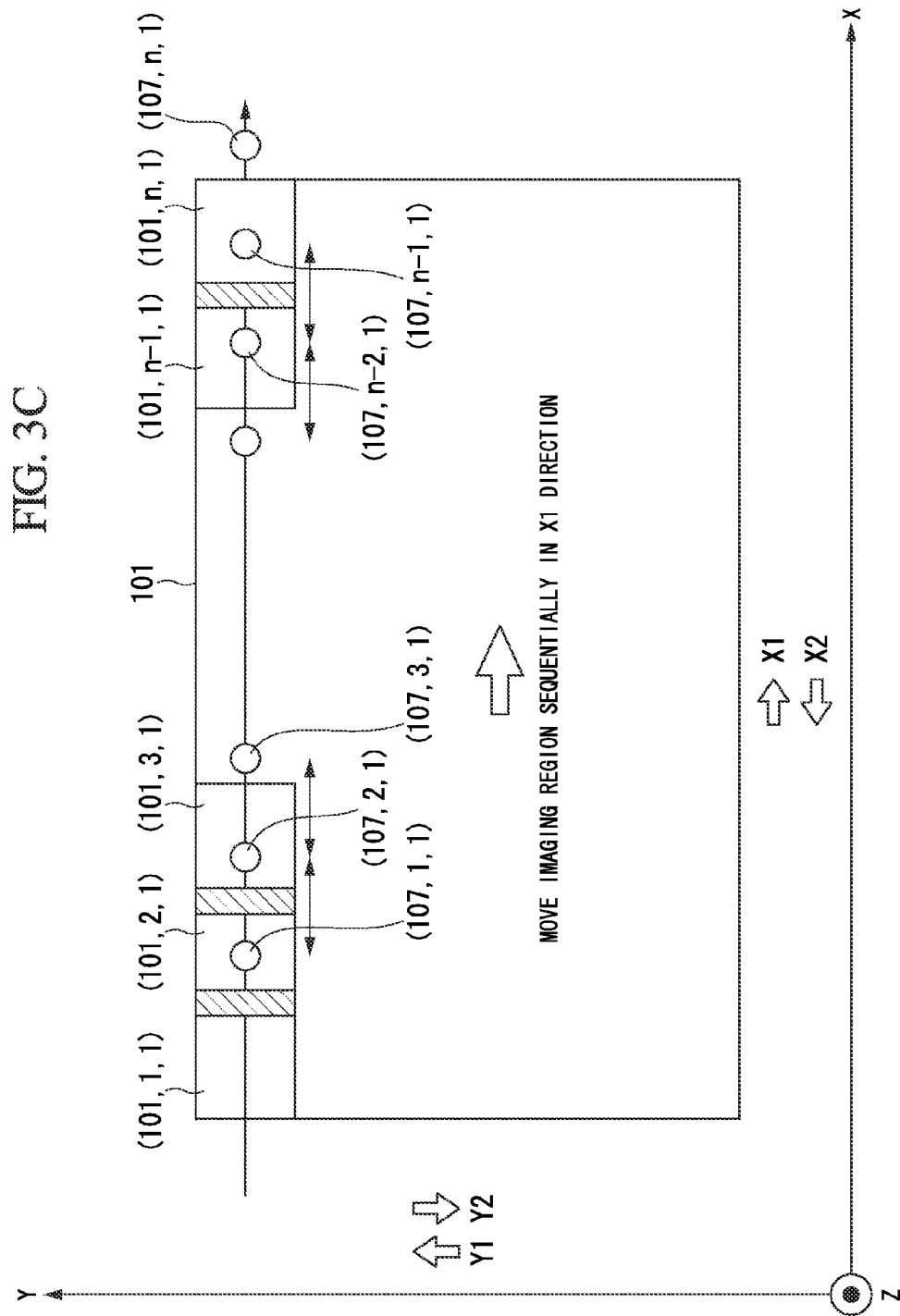

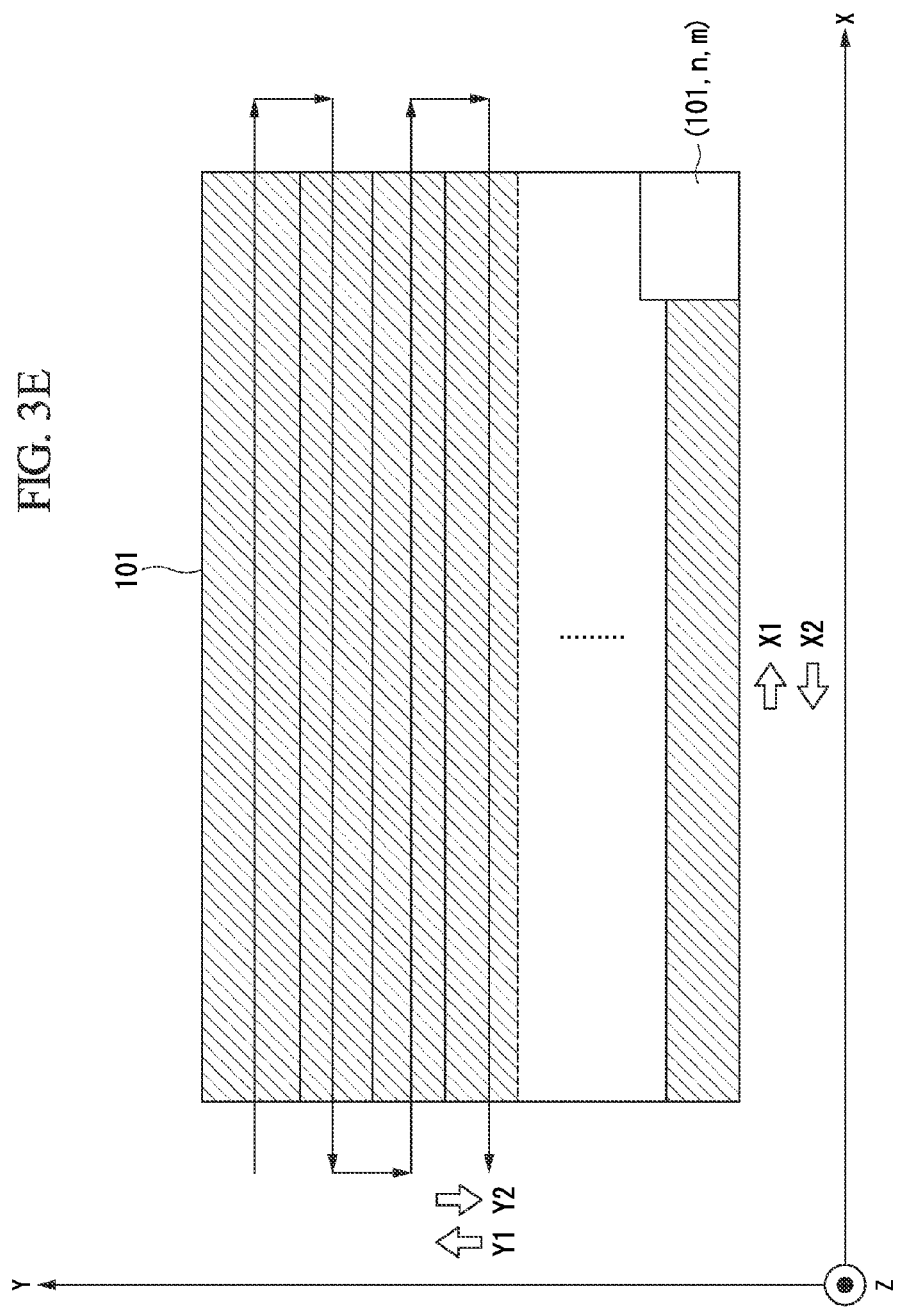

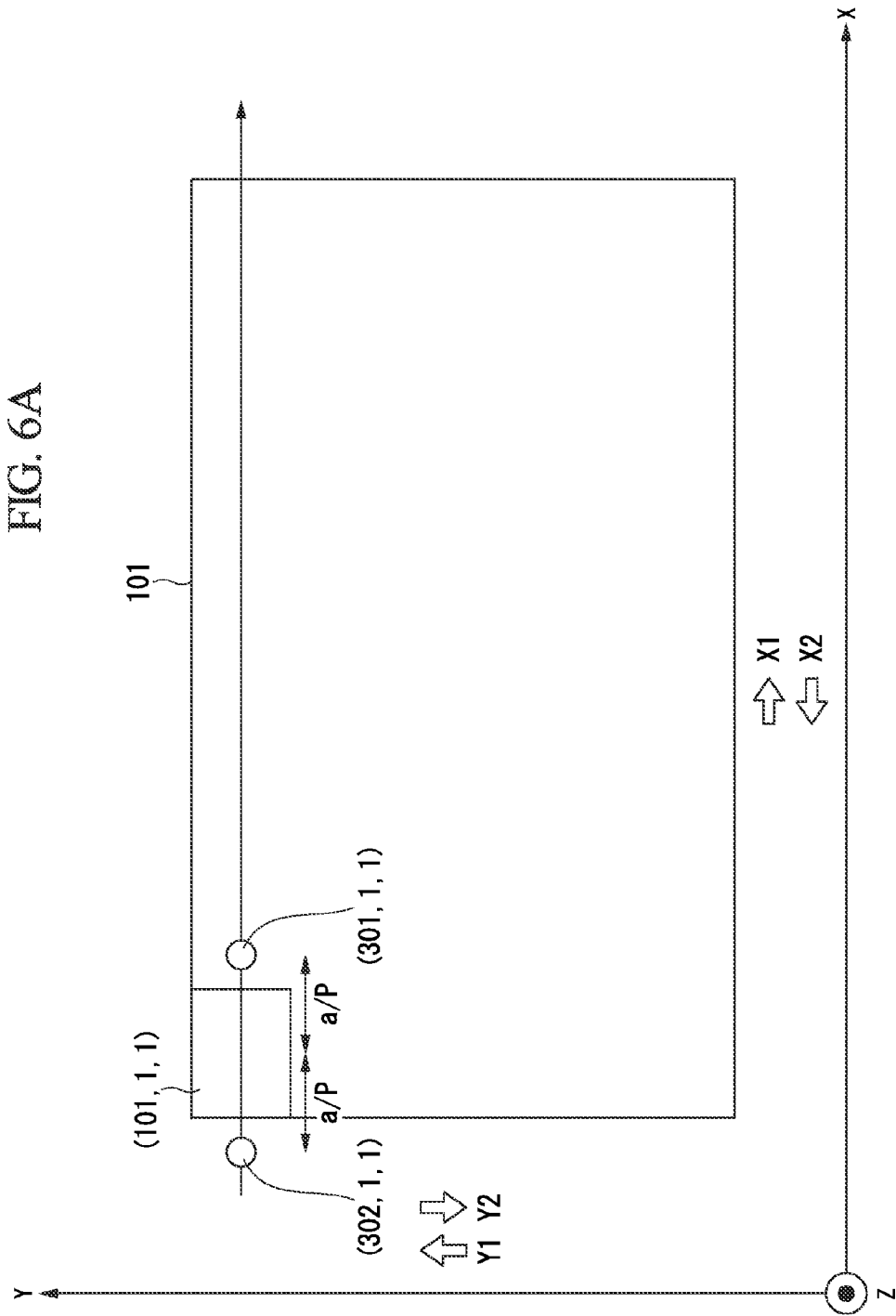

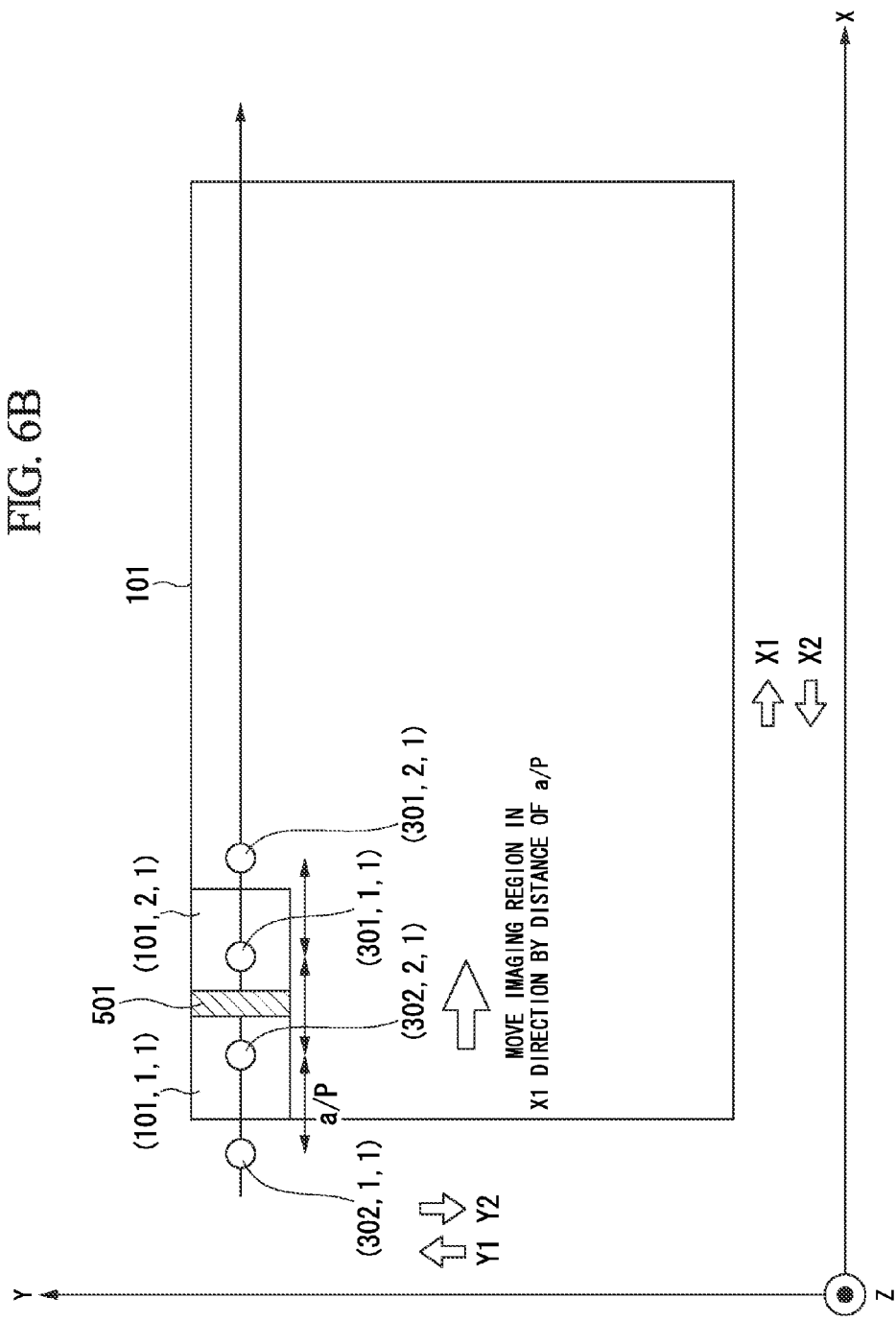

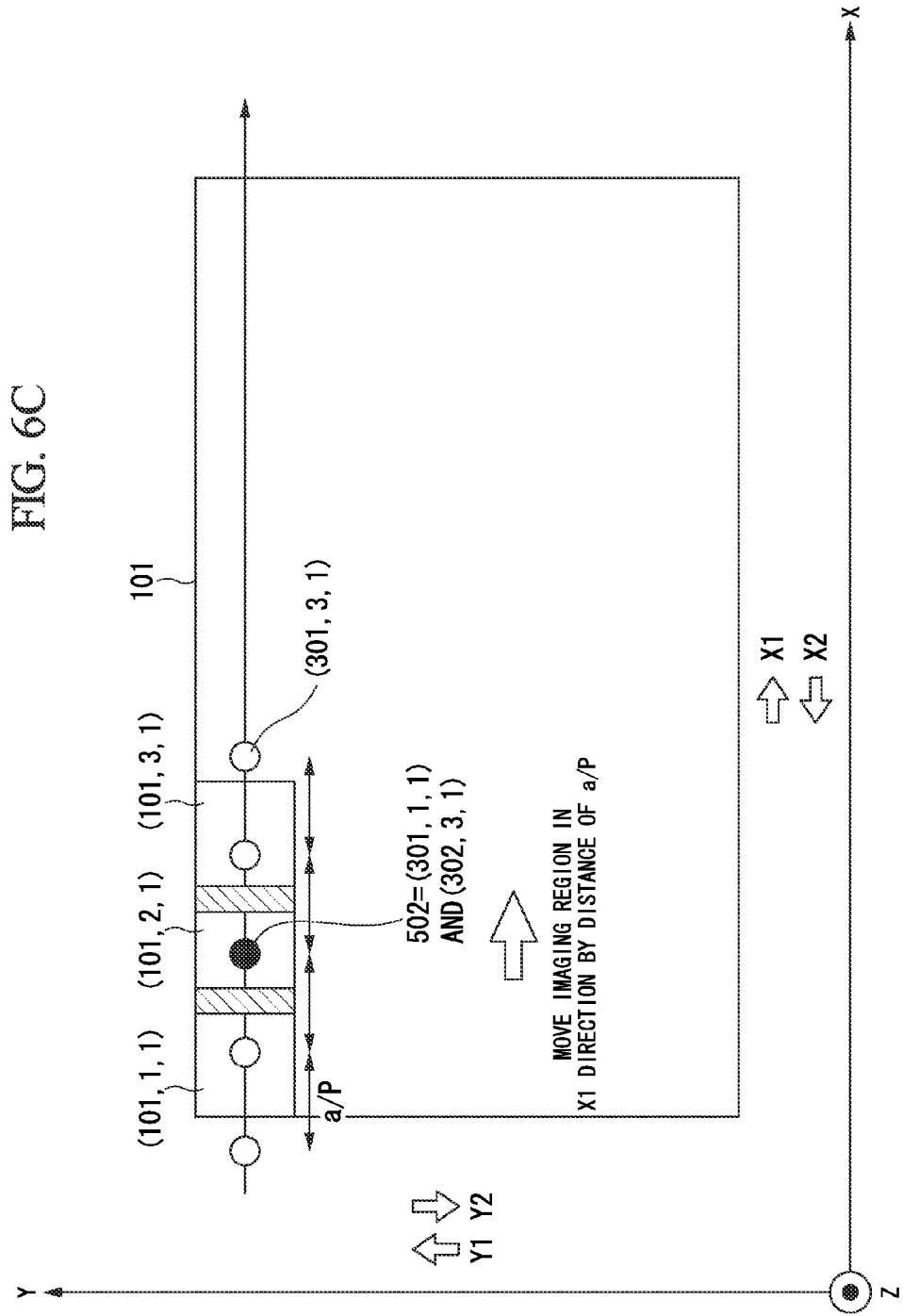

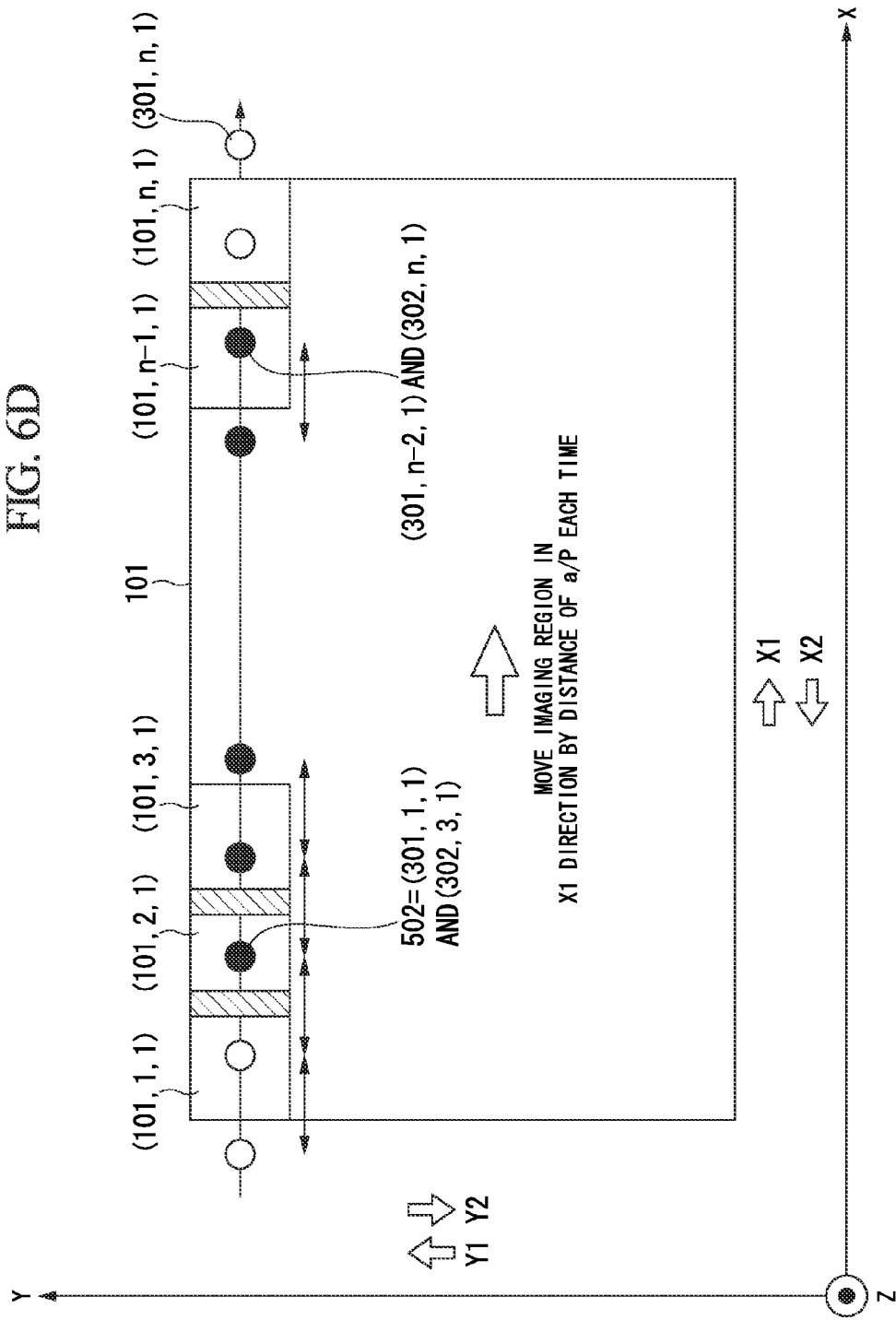

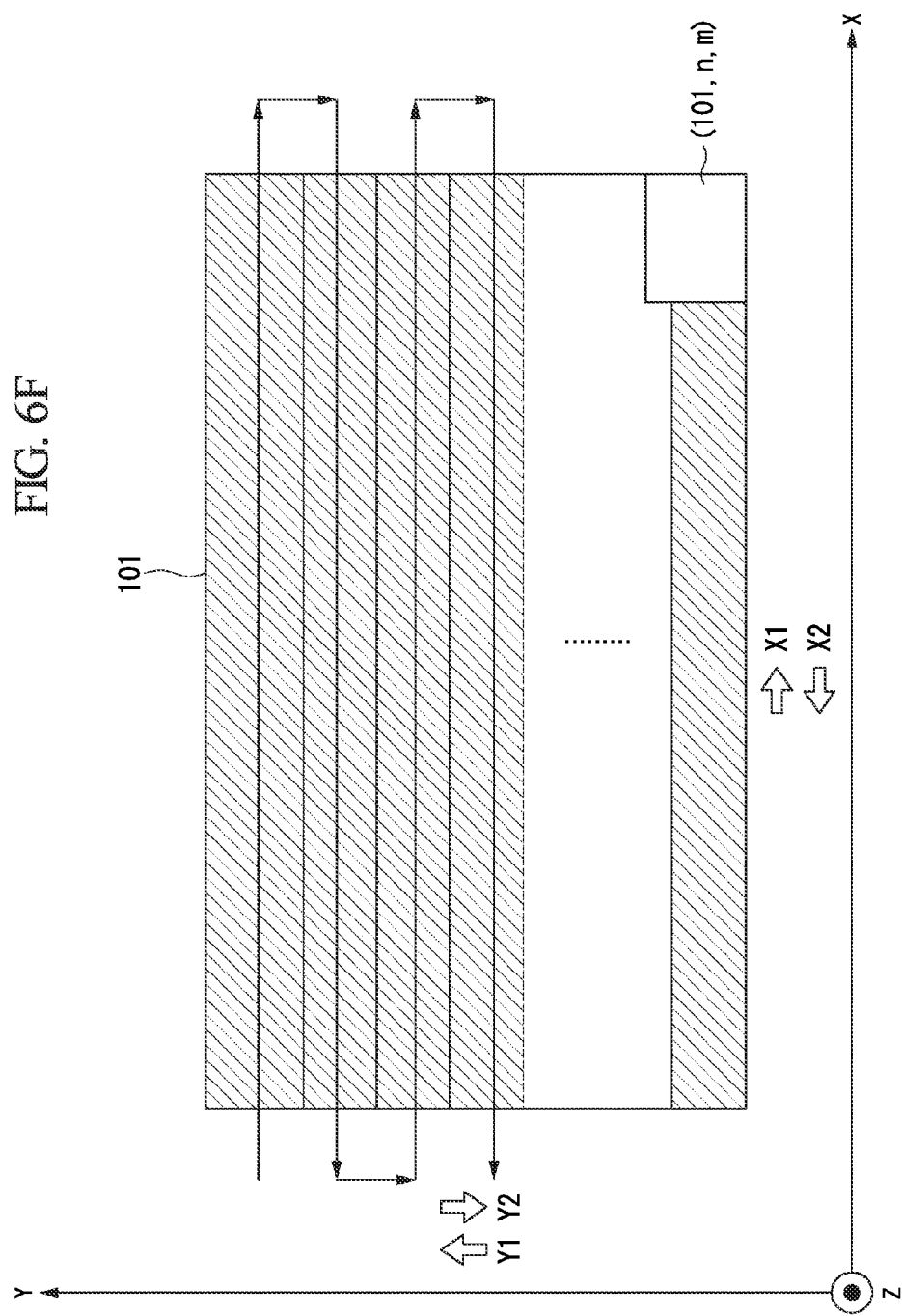

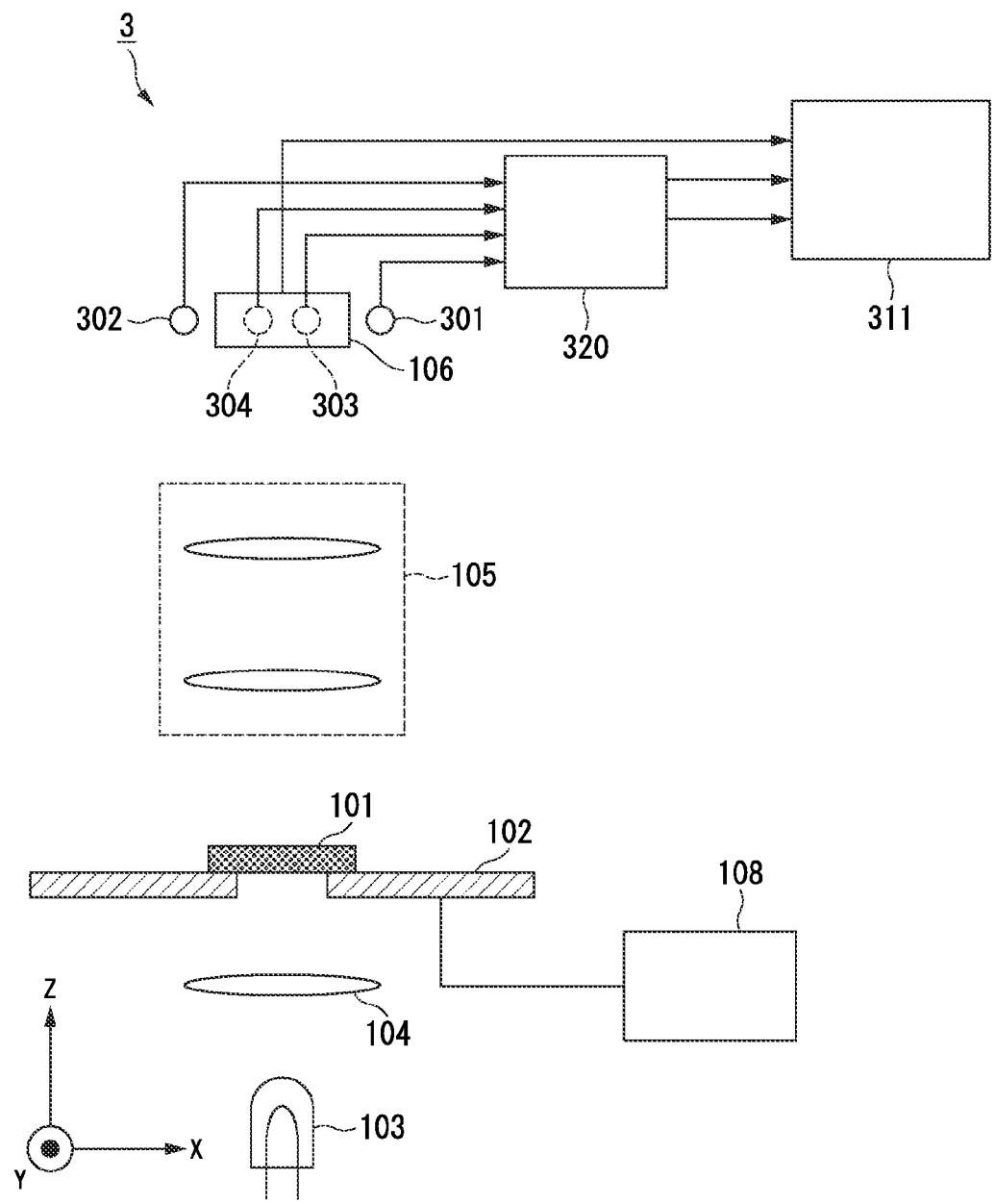

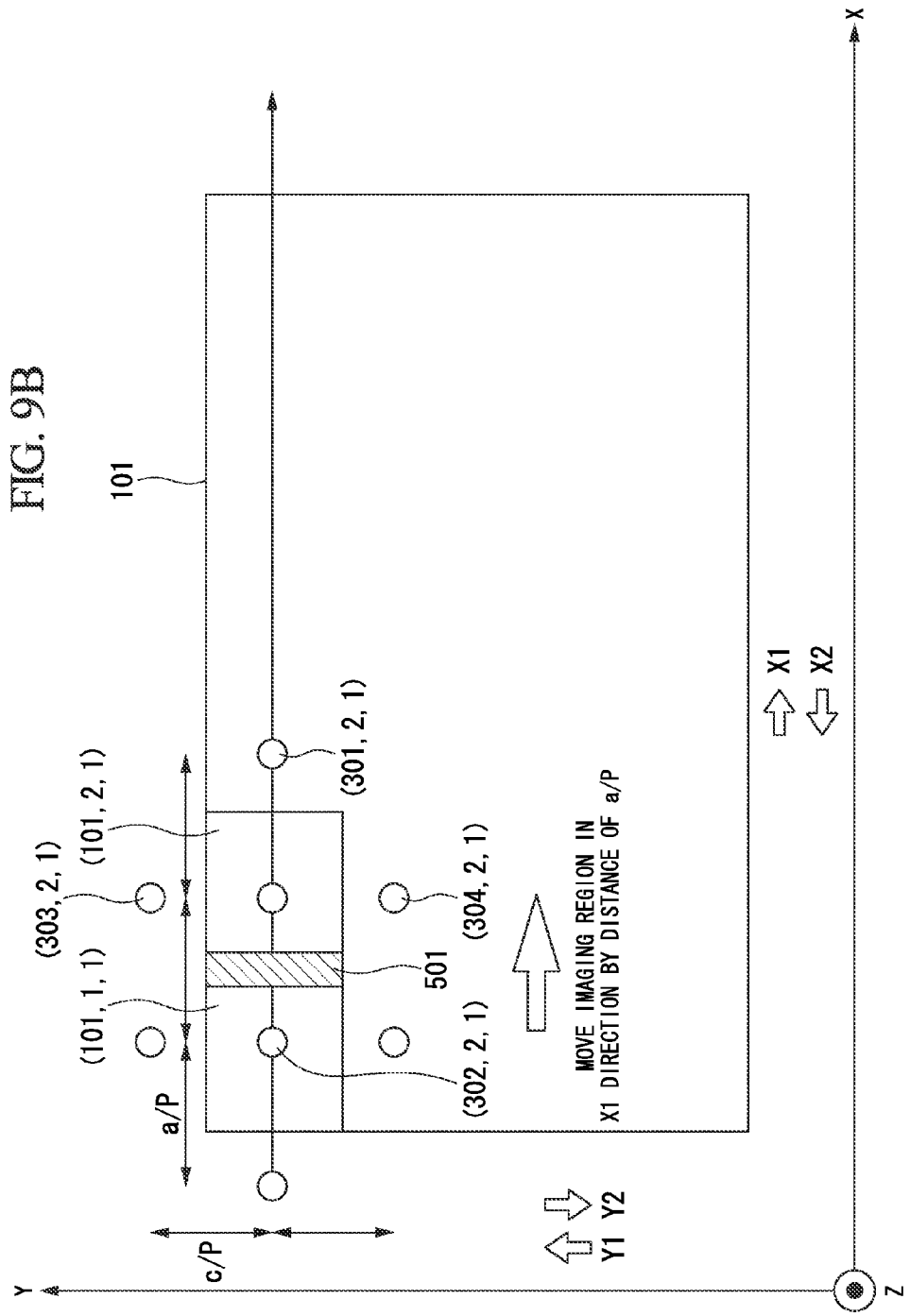

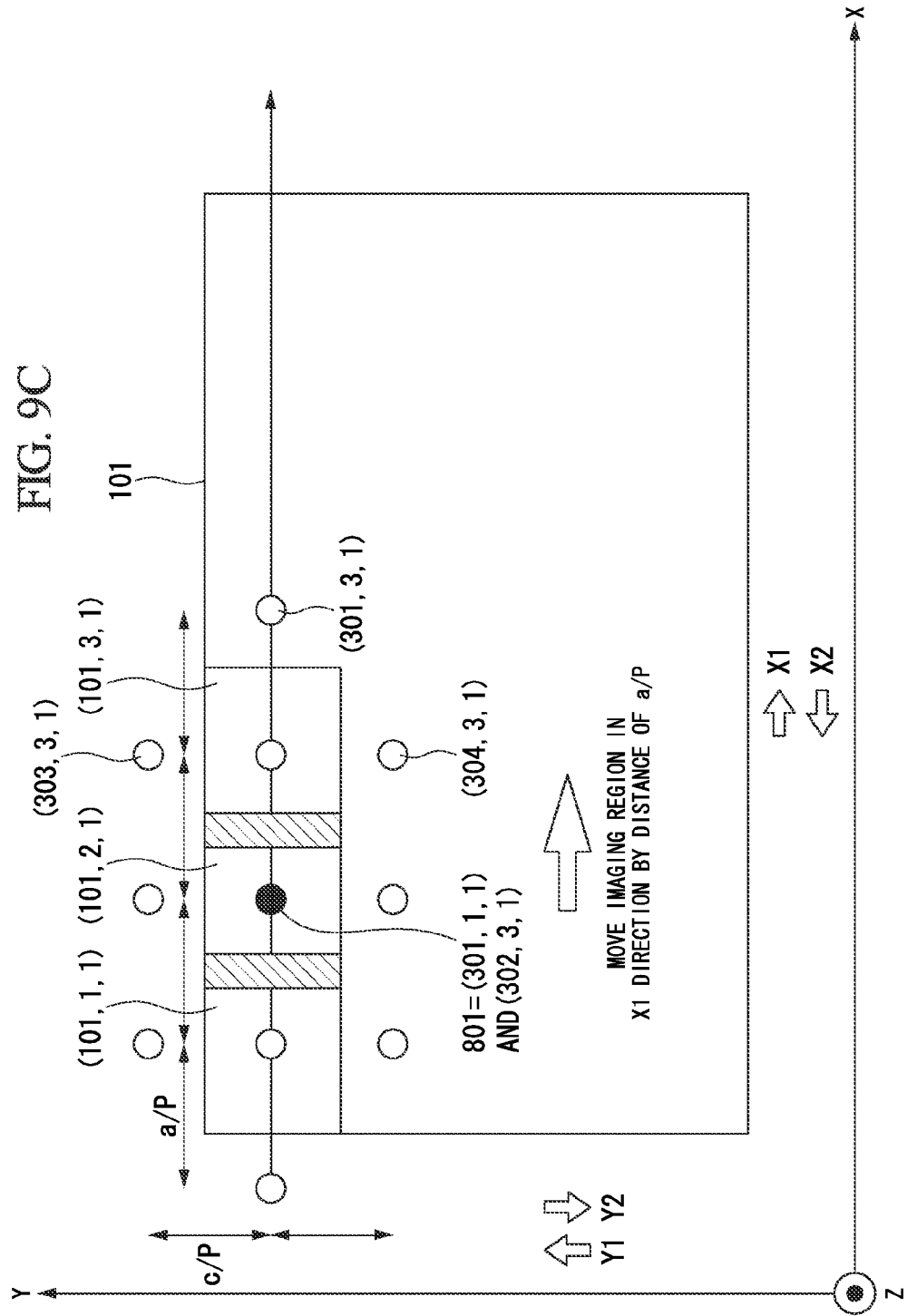

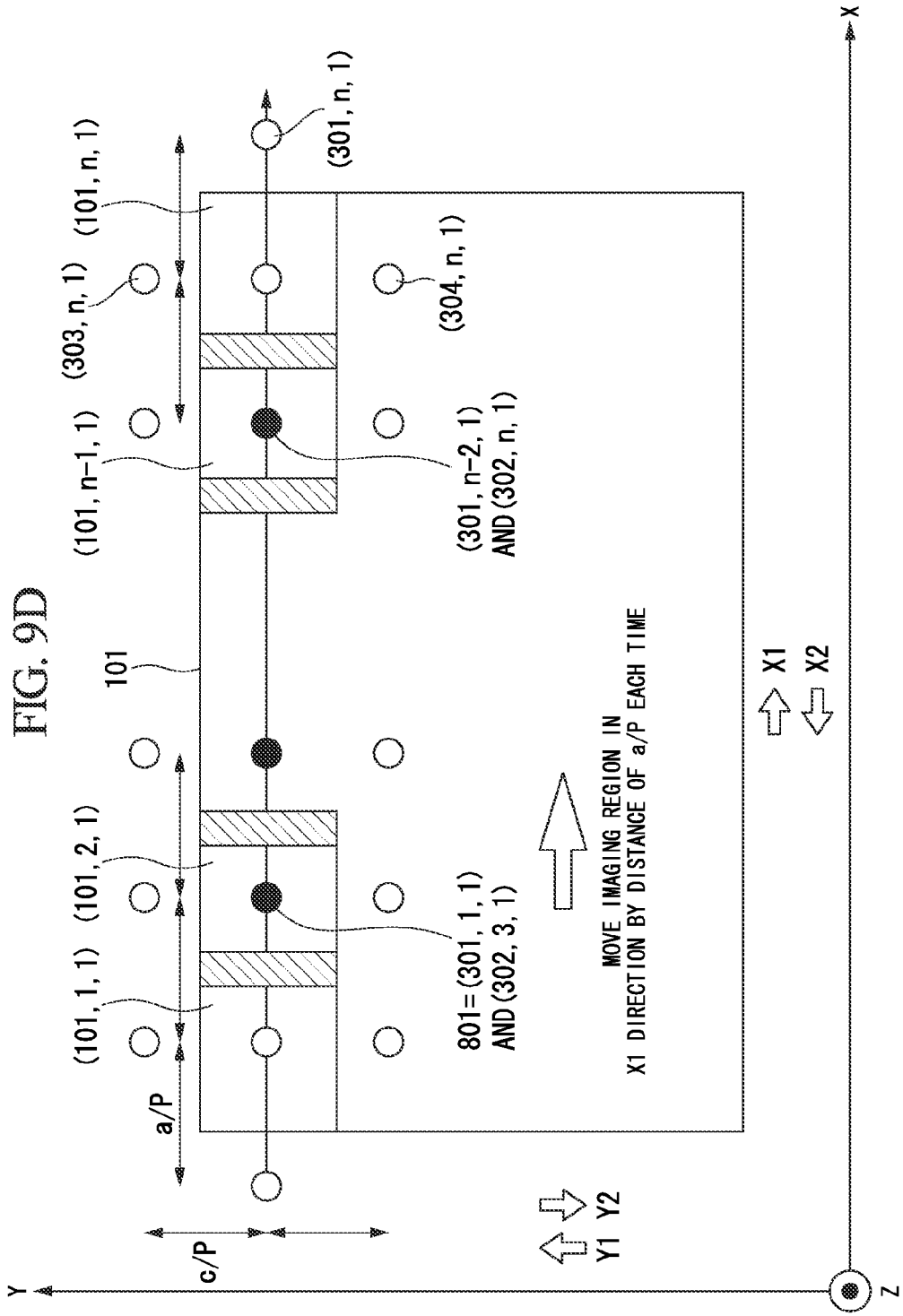

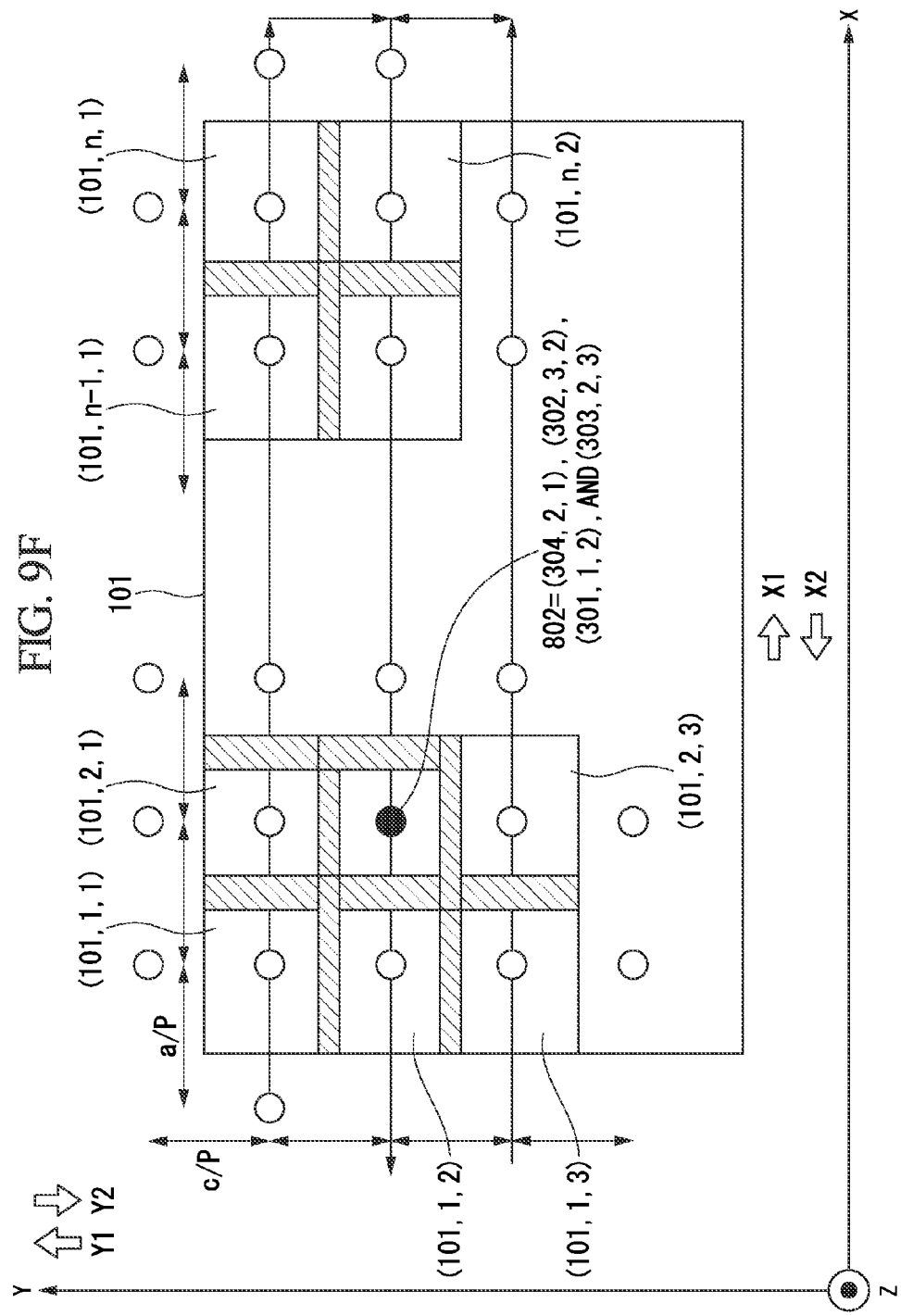

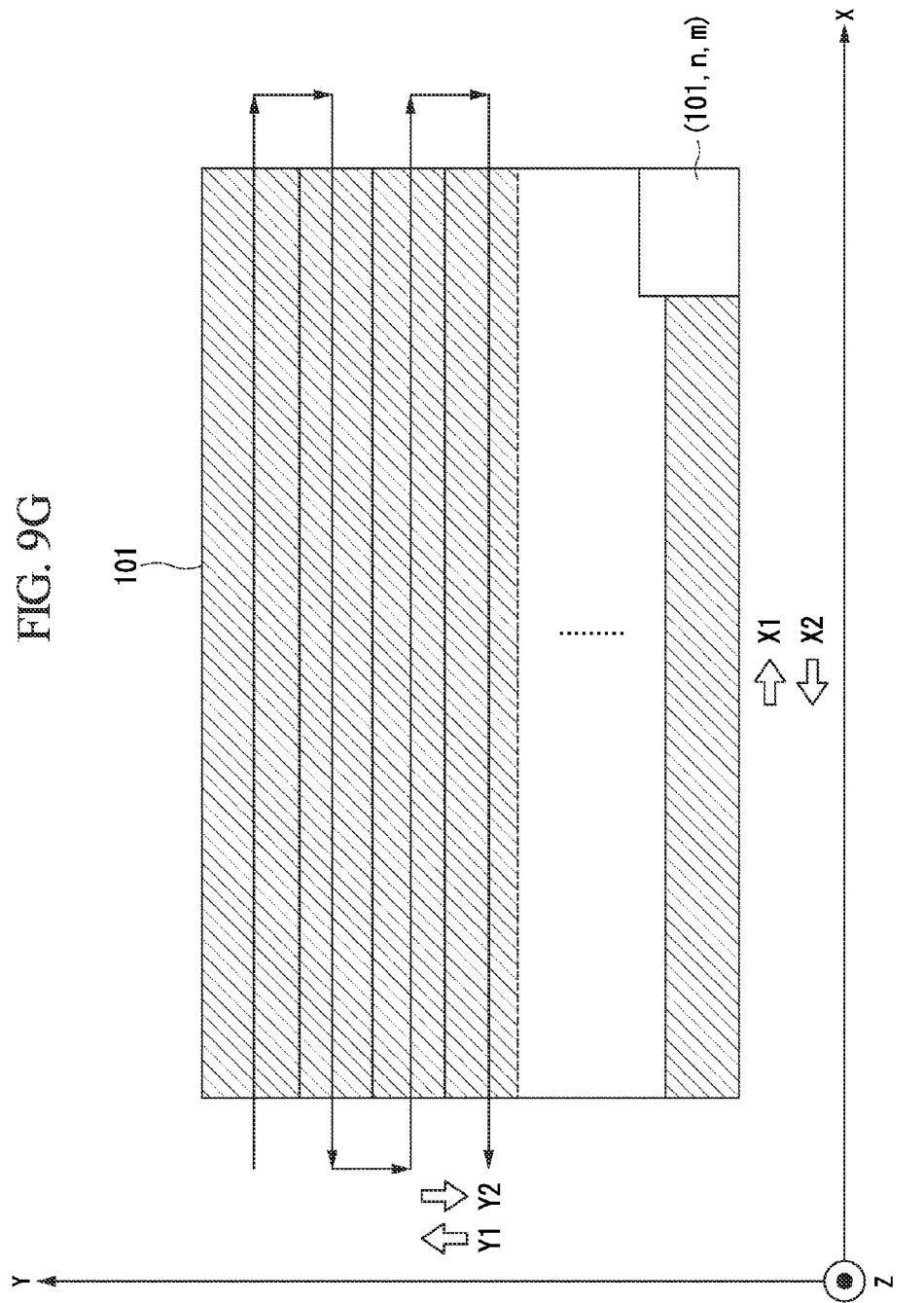

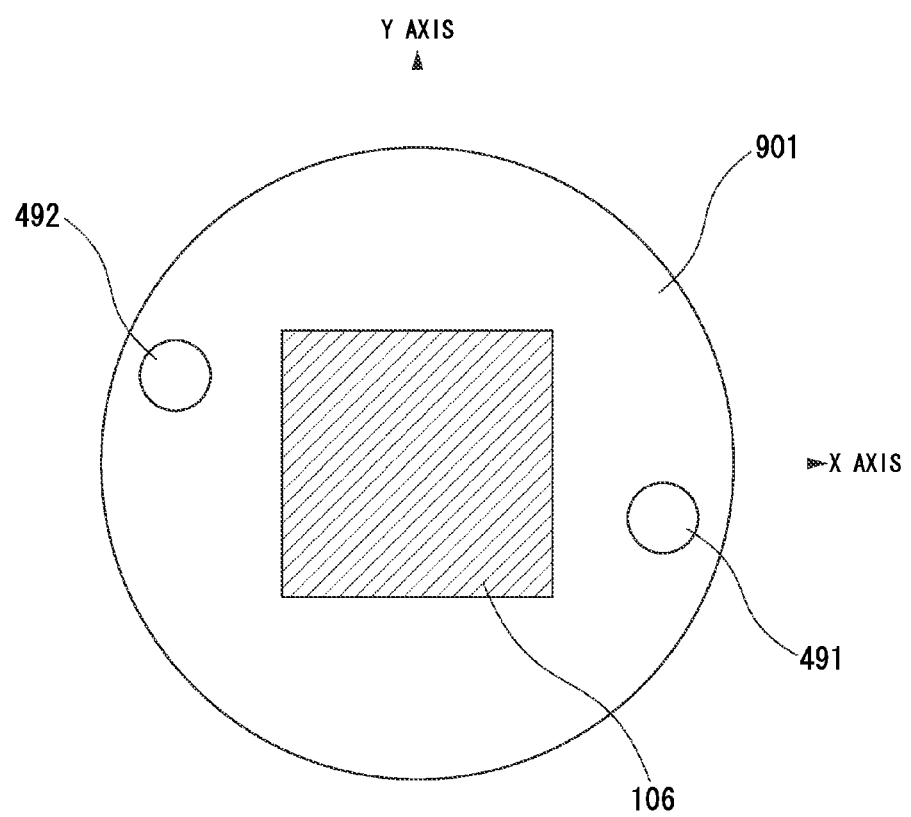

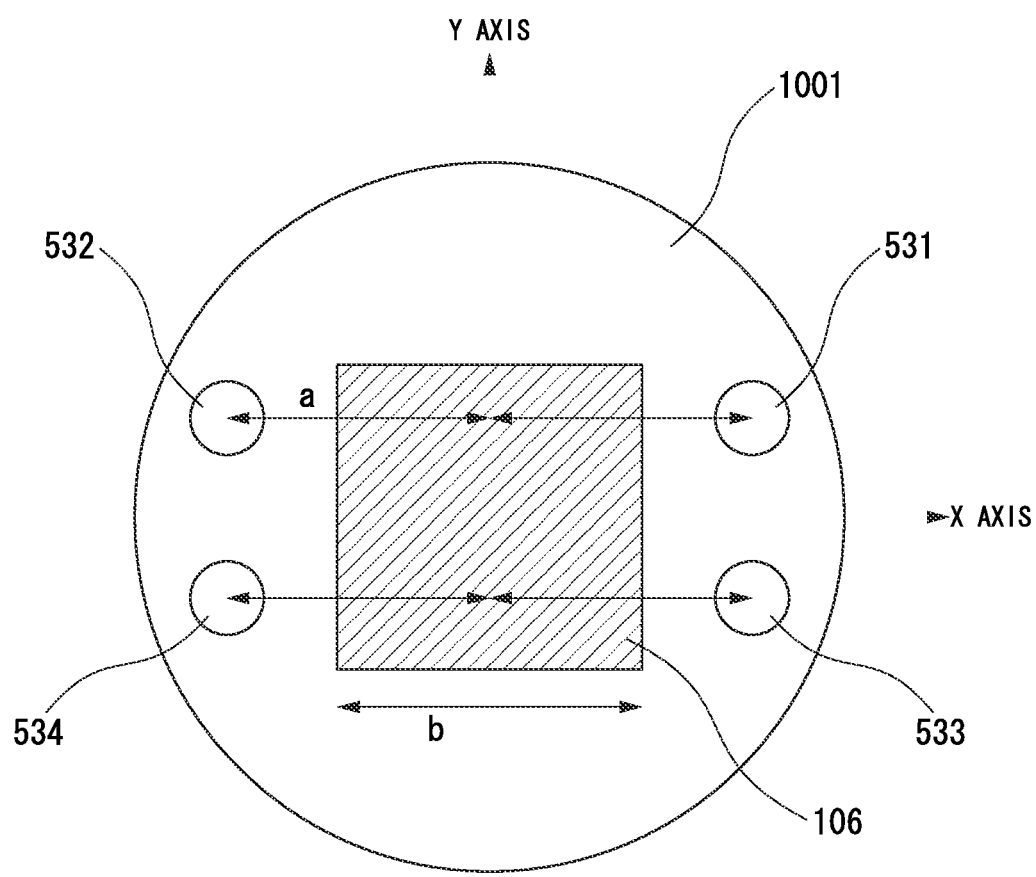

IMAGING SYSTEM

BACKGROUND OF THE INVENTION

1. Field of the Invention

The present invention relates to an imaging system.

Priority is claimed on Japanese Patent Application No. 2010-195974, filed Sep. 1, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, there is an imaging system that detects the spectrum of a sample arranged on a stage or the like (See Japanese Unexamined Patent Application, First Publication No. 2008-209627). FIG. 13 is a view illustrating a schematic configuration of a conventional imaging system disclosed in Japanese Unexamined Patent Application, First Publication No. 2008-209627. As shown in FIG. 13, in the conventional imaging system 10, a sample 1201 is arranged on a stage 1202, and light from a transmission light source 1203 is irradiated onto it via a condenser lens 1204. A driving device 1209 moves the stage 1202 in an X-axis direction and a Y-axis direction that intersect each other orthogonally. Light of a predetermined region transmitted through the sample 1201 passes through an image-forming optical system 1205 and forms an image on an imaging element 1207 and a spectrum detector 1208. At this time, some of the light from the sample 1201 that passed through the image-forming optical system 1205 is transmitted by an optical path diving device 1206 such as a half mirror and irradiated to an imaging element 1207, while some of the light is reflected and irradiated to the spectrum detector 1208.

The imaging element 1207 detects the light of a predetermined region of the sample 1201 that was irradiated via the image-forming optical system 1205, and obtains (captures) an image corresponding to the detected light. The spectrum detector 1208 detects the spectrum of the light of the predetermined region of the sample 1201 irradiated via the image-forming optical system 1205, and outputs a spectrum signal corresponding to the detected spectrum. The imaging element 1207 and the spectrum detector 1208 are arranged such that they detect light in the same region of the sample 1201, and the spectrum detector 1208 detects the spectrum in a predetermined region of the sample 1201 that is an imaging region of the imaging element 1207. The Z-axis shown in FIG. 13 is a direction orthogonal (perpendicular) to the plane formed by the X-axis direction and the Y-axis direction that the stage 1202 moves in.

One example of an imaging system is a virtual microscope. A virtual microscope is an imaging system wherein a stage is moved while an imaging element divides all or part of a sample into regions and captures images of them; the divided images (digital images) thereby captured are pasted together to form a single digital image (virtual slide) of the whole sample. With a virtual microscope, a virtual slide made by pasting together high-resolution divided images can be manipulated using, for example, a personal computer to change the magnification or observation position of the sample, which is being displayed on a monitor. Since the virtual slide created by a virtual microscope can be shared simultaneously with a plurality of locations by transmitting it via a network, use of virtual microscopes is proliferating in the field of telepathology. In telepathology, the color information of a sample observed by the virtual microscope must match that of the created virtual slide. Consequently there is a demand that a virtual microscope has high color reproduction characteristic of the sample image.

"Experimental evaluation of color image estimation method using multipoint spectrum measurements" by Tokyo Institute of Technology, Imaging Science and Engineering Laboratory, K. Ietomi et al., Proceedings of the 54th Spring Meeting, JSAP and Related Societies, 2007 Spring (which is hereinafter referred to as a Non-Patent Literature 1) discloses an example of a technology that corrects the image captured by the imaging element to enhance the color reproduction characteristic of the captured image (sample image). The technology for enhancing the color reproduction characteristic of a captured image disclosed in Non-Patent Literature 1 will be explained by using FIG. 14. FIG. 14 is a pattern diagram illustrating the technology for enhancing the color reproduction characteristic of a captured image disclosed in Non-Patent Literature 1. In FIG. 14, region 1301 is one where an imaging element detects light of a predetermined region of a sample that forms an image in a focal plane, and region 1302 is one which a spectrum detector detects the spectrum of the light in the focal plane.

Here, 'focal plane' is the irradiation area of the light in the plane where light from the sample forms an image. In the technology disclosed in Non-Patent Literature 1, an RGB camera and a multi-band camera are used as the imaging element and the spectrum detector. In the technology disclosed in Non-Patent Literature 1, the image captured by the imaging element (sample image) is corrected on the basis of information used in color-correction that is contained in a spectrum signal output from the spectrum detector (which is hereinafter referred to as 'spectrum information'), thereby enhancing the color reproduction characteristic of the sample image.

Conceivably, if the technology disclosed in Non-Patent Literature 1 is applied in the imaging system disclosed in Japanese Unexamined Patent Application, First Publication No. 2008-209627, this would achieve an imaging system that obtains a sample image with enhanced color reproduction characteristic as demanded by a virtual microscope. Specifically, in the conventional imaging system 10 shown in FIG. 13, the imaging element 1207 corrects the captured image on the basis of spectrum information output from the spectrum detector 1208. This can enhance the color reproduction characteristic of the image of the sample 1201.

When the technology disclosed in Non-Patent Literature 1 is applied in the imaging system disclosed in Japanese Unexamined Patent Application, First Publication No. 2008-209627, the spectrum detector 1208 of the conventional imaging system 10 shown in FIG. 13 is used for enhancing the color reproduction characteristic of the sample image captured by the imaging element 1207. Therefore, to correct the color reproduction characteristic of the sample image at high resolution, a sufficient quantity of light must be made incident to the spectrum detector 1208.

However, in the conventional imaging system 10 shown in FIG. 13, the optical path-diving device 1206 divides light from the sample 1201 that passed through the image-forming optical system 1205, and light is then irradiated to the imaging element 1207 and the spectrum detector 1208. Therefore, only some of the light from the sample 1201 is irradiated to the imaging element 1207 and the spectrum detector 1208. Consequently, a sufficient quantity of light cannot reliably be made incident to the spectrum detector 1208, resulting in a reduction in the signal-to-noise ratio (SNR), which expresses the amount of noise in the spectrum signal output from the spectrum detector 1208. Depending on the region where the sample 1201 is being observed, the transmissivity of the light from the transmission light source 1203 decreases, and the signal output of the spectrum signal from the spectrum detector 1208 becomes so small that the signal component is buried in noise. Consequently, the SNR of the spectrum signal decreases even further.

When attempting to enhance the color reproduction characteristic of the sample image captured by the imaging element 1207 on the basis of the spectrum information output from the spectrum detector 1208 in this state, sufficient correction is impossible, and the color reproduction characteristic of the sample image cannot be enhanced. This is due to the low SNR of the spectrum signal output from the spectrum detector 1208.

SUMMARY OF THE INVENTION

The present invention provides an imaging system that can obtain a spectrum signal with a high SNR from a spectrum detector.

An imaging system may include a stage on where a sample to be observed is arranged, an optical system that forms an image of light irradiated onto the sample in a predetermined focal plane, an imaging element that includes a pixel array in which a plurality of pixels are arranged in a two-dimensional matrix, each of the pixels detecting at least a part of the light of the image of the sample formed in the focal plane, the imaging element obtaining the image of the sample corresponding to the light detected by the pixel array, a spectrum detecting unit that is arranged such as to be adjacent to the pixel array, the spectrum detecting unit detecting a spectrum of the light in the focal plane to output spectrum information, and a correcting unit that corrects the image of the sample obtained by the imaging element based on the spectrum information output from the spectrum detecting unit.

The stage may move in a direction perpendicular to an optical axis of the optical system that the light irradiated to the sample is incident to. The spectrum detecting unit may include a first spectrum detector and a second spectrum detector arranged at positions that are symmetrical to a first direction that is parallel or orthogonal to a row direction or a column direction of the pixel array, taking a predetermined position in the pixel array as a reference. The first spectrum detector may detect the spectrum of the light in a first observation region of the sample corresponding to a first region in the focal plane, and outputs first spectrum information. The second spectrum detector may detect the spectrum of the light in a second observation region of the sample corresponding to a second region in the focal plane, and outputs second spectrum information. If there is at least a partial overlap between the first observation region, which corresponds to the first region detected by the first spectrum detector when the stage is at a first position, and the second observation region, which corresponds to the second region detected by the second spectrum detector when the stage is at a second position, the correcting unit may correct the image of the sample obtained by the imaging element based on the first spectrum information, which has been obtained when the first spectrum detector has detected the spectrum of the light of an overlapping observation region, and the second spectrum information, which has been obtained when the second spectrum detector has detected the spectrum of the light of the overlapping observation region.

The spectrum detecting unit may further include a first spectrum detector and a second spectrum detector arranged at positions that are symmetrical to a second direction that is parallel or orthogonal to the first direction with respect to the reference. The third spectrum detector may detect the spectrum of the light in a third observation region of the sample corresponding to a third region in the focal plane, and output third spectrum information. The fourth spectrum detector may detect the spectrum of the light in a fourth observation region of the sample corresponding to a fourth region in the focal plane, and output fourth spectrum information. If there is at least a partial overlap between at least one of the third observation region, which corresponds to the third region detected by the third spectrum detector when the stage is at a third position, the fourth observation region, which corresponds to the fourth region detected by the fourth spectrum detector when the stage is at a fourth position, and the overlapping observation region, the correcting unit may correct the image of the sample obtained by the imaging element based on at least one of the third spectrum information, which has been obtained when the third spectrum detector has detected the spectrum of light of the overlapping observation region, and the fourth spectrum information, which has been obtained when the fourth spectrum detector has detected the spectrum of light of the overlapping observation region, the first spectrum information, which has been obtained when the first spectrum detector has detected the spectrum of light of the overlapping observation region, and the second spectrum information, which has been obtained when the second spectrum detector has detected the spectrum of light of the overlapping observation region.

The spectrum detecting unit may include a plurality of spectrum detectors that detect the spectrum of the light in the focal plane. Each of the plurality of spectrum detectors may detect the spectrum of the light in a different region in the focal plane, and output the spectrum information corresponding to the spectrum of the light that has been detected. The correcting unit may correct the image of the sample, which has been obtained by the imaging element, based on the spectrum information output from each of the spectrum detectors of the spectrum detecting unit.

The correcting unit may include an adding unit that adds a plurality of pieces of the spectrum information, which has been detected by a plurality of spectrum detectors in the overlapping region. The correcting unit may correct the image of the sample, which has been obtained by the imaging element, based on the spectrum information added by the adding unit.

BRIEF DESCRIPTION OF THE DRAWINGS

Referring now to the attached drawings which form a part of this original disclosure:

FIG. 2 is schematic diagram illustrating an example of a positional relationship between an imaging element and a spectrum detector on a focal plane of the imaging system in accordance with the first preferred embodiment of the present invention;

FIGS. 3A to 3E are diagrams of schematic examples of relationships between a region captured by the imaging element and a region detected by the spectrum detector;

FIGS. 6A to 6F are schematic diagrams illustrating examples of the positional relationship between a region that the imaging element captures an image of, and regions that the spectrum detectors detect;

FIG. 7 is a diagram illustrating the schematic configuration of an imaging system in accordance with a second preferred embodiment of the present invention;

FIGS. 9A to 9G are schematic diagrams illustrating examples of positional relationships between regions that the imaging element captures an image of, and regions detected by the spectrum detectors;

FIG. 10 is a schematic diagram illustrating an example of the positional relationship between the imaging element and a plurality of spectrum detectors in a focal plane of the imaging system in accordance with a fourth preferred embodiment of the present invention;

FIG. 11 is a schematic diagram illustrating an example of the positional relationship between an imaging element and a plurality of spectrum detectors in a focal plane of the imaging system in accordance with a fifth preferred embodiment of the present invention;

DETAILED DESCRIPTION OF THE INVENTION

Figure 1:
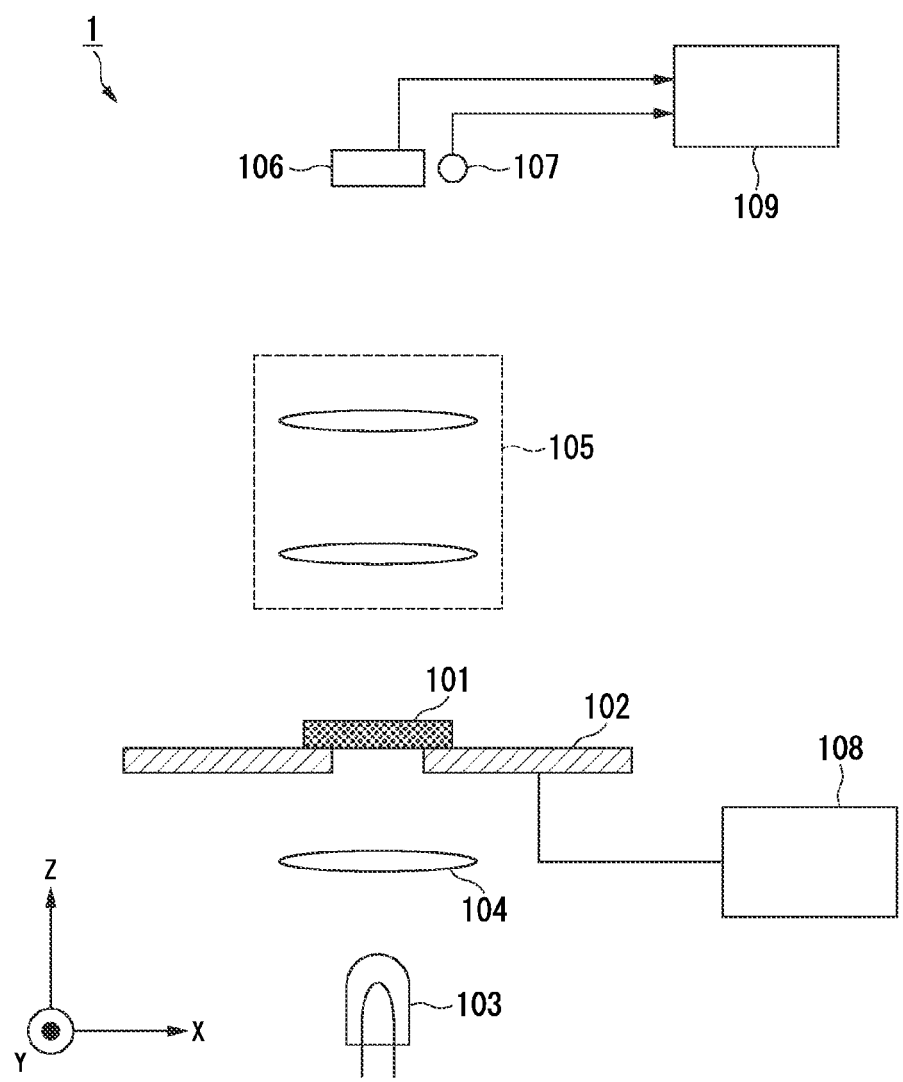
FIG. 1 is a view illustrating a schematic configuration of an imaging system in accordance with a first preferred embodiment of the present invention.

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.
First Preferred Embodiment A first preferred embodiment of the present invention will be described with reference to the drawings. FIG. 1 is a view illustrating a schematic configuration of an imaging system in accordance with the first preferred embodiment of the present invention. In FIG. 1, an imaging system 1 includes a stage 102, a transmission light source 103, a condenser lens 104, an image-forming optical system 105, an imaging element 106, a spectrum detector 107, a driving device 108, and a correcting unit 109. In FIG. 1, a sample 101 is to be observed by the imaging system 1 of the first preferred embodiment, and is not a constitutive part of the imaging system 1.

The imaging system 1 divides the sample 101 to be observed into a plurality of regions and captures images of them; it then pastes the divided images (digital images) together to create a single digital image (virtual slide) of the whole sample. The imaging system 1 detects spectra at a plurality of points in the virtual slide, corrects the color reproduction characteristic of the virtual slide based on spectrum information contained in a spectrum signal corresponding to each detected spectrum, and outputs the corrected virtual slide as a virtual slide of the imaging system 1.

In the imaging system 1, the sample 101 is arranged on the stage 102, which the driving device 108 drives in an X-axis direction and in a Y-axis direction orthogonal to the X-axis direction. This driving of the stage 102 by the driving device 108 controls the region of the sample 101 detected by the imaging element 106 and the spectrum detector 107, i.e. the range of division and imaging. In FIG. 1, a Z-axis is a direction orthogonal (i.e. perpendicular) to the plane formed when the stage 102 moves in the X-axis and Y-axis directions.

Illuminating light from the transmission light source 103 is condensed in the condenser lens 104 and irradiated onto the sample 101. Light transmitted through the sample 101 passes through the image-forming optical system 105 with a magnification rate of P times constituted by a plurality of lenses, and forms an image in a focal plane containing the imaging element 106 and the spectrum detector 107. The positional relationship between the imaging element 106 and the spectrum detector 107 will be described later.

The imaging element 106 includes a pixel array in which a plurality of light-detecting pixels are arranged in the X-axis direction and the Y-axis direction, and obtains (captures) a captured image corresponding to the transmission light of the sample 101 in a predetermined region formed in the focal plane. The spectrum detector 107 detects a spectrum corresponding to the transmission light of the sample 101 in a predetermined region formed on the focal plane, and outputs a spectrum signal corresponding to the detected spectrum. The image captured by the imaging element 106 and the spectrum signal output from the spectrum detector 107 are outputted to the correcting unit 109. On the basis of spectrum information contained in the spectrum signal inputted from the spectrum detector 107, the correcting unit 109 corrects the captured image inputted from the imaging element 106, and outputs it as a virtual slide in the imaging system 1.

The correcting unit 109 can be arranged at a distance from the imaging element 106 and the spectrum detector 107. The imaging element 106 and the spectrum detector 107 transmit the captured image and the spectrum signal corresponding to the detected spectrum to the correcting unit 109, which performs a correction process to the captured image based on the spectrum information contained in the spectrum signal it received.

The positional relationship between the imaging element 106 and the spectrum detector 107 in the imaging system 1 in accordance with the first preferred embodiment of the present invention will be described. FIG. 2 is schematic diagram illustrating an example of a positional relationship between the imaging element 106 and the spectrum detector 107 on the focal plane of the imaging system 1 in accordance with the first preferred embodiment of the present invention. FIG. 2 shows a focal plane 201, which is formed by the image-forming optical system 105 of the imaging system 1, and the positions of the imaging element 106 and the spectrum detector 107. FIG. 2 also shows the region where the imaging element 106 captures the captured image, and the region where the spectrum detector 107 detects the spectrum. As shown in FIG. 2, in the imaging system 1, the imaging element 106 and the spectrum detector 107 are adjacent to each other.

An operation of the imaging system 1 in accordance with the first preferred embodiment of the present invention will be described. FIGS. 3A to 3E are diagrams of schematic examples of relationships between the region captured by the imaging element 106 and the region detected by the spectrum detector 107. FIGS. 3A to 3E simultaneously show the sample 101 disposed on the stage 102, the region where the imaging element 106 captures the sample 101, and the region where the spectrum detector 107 detects the spectrum.

In the imaging system 1, to divide the sample 101 into a plurality of regions for capturing images, the driving device 108 drives the stage 102 in the X-axis direction and in the Y-axis direction. Each time the stage 102 moves by a predetermined amount (distance), the imaging element 106 captures an image of a region of a part of the transmission light on the sample 101 in the focal plane 201, and the spectrum detector 107 detects the spectrum of a region of a part of the transmission light on the sample 101 in the focal plane 201.

The driving device 108 controls the amount of movement of the stage 102 such that the correcting unit 109 can synthesize the images captured by the imaging element 106 and thereby create a captured image of the whole sample 101. That is, the driving device 108 controls the movement amount of the stage 102 in the X-axis and Y-axis directions, adjusting it such that the imaging regions of the sample 101 that the imaging element 106 captures images of are overlapping or adjacent to each other.

The following explanation describes an operation performed when adjusting the movement amount such that the imaging regions overlap each other. Imaging regions of the sample 101 that the imaging element 106 captures images of, the detection regions of the sample 101 that the spectrum detector 107 detects, the images and spectrum signals obtained by imaging and detection, and the like, are designated using reference codes of constitutive elements that perform the operation, and XY coordinates indicating their positions. For example, an imaging region of the sample captured by the imaging element 106 is expressed as 'imaging region (101, X, Y)', and a detection region detected by the spectrum detector 107 is expressed as 'detection region (107, X, Y)'. The imaging operation wherein the imaging element 106 captures an image of the imaging region (101, X, Y), and the detection operation wherein the spectrum detector 107 detects the detection region (107, X, Y), are expressed as 'shot number (X, Y)'.

The image of the imaging region (101, X, Y) captured by the imaging element 106 in shot number (X, Y) is expressed as 'captured image I (106, X, Y)'. The spectrum signal obtained when the spectrum detector 107 detects the detection region (107, X, Y) is expressed as 'spectrum signal S (107, X, Y)'. X is an integer expressing a position in the X-axis direction, and Y is an integer expressing a position in the Y-axis direction.

The operation of the imaging system 1 will be described more concretely. Firstly, as shown in FIG. 3A, when the imaging system 1 starts its observation of the sample 101, at shot number (1, 1), the imaging element 106 captures an image of an imaging region (101, 1, 1) and obtains a captured image I (106, 1, 1). The spectrum detector 107 performs spectrum detection of the detection region (107, 1, 1), and obtains a spectrum signal S (107, 1, 1). The position of the stage 102 for performing shot number (1, 1) is termed 'initial stage position'.

The driving device 108 then moves the stage 102 from the initial stage position in the direction of the arrow X2, i.e. it moves the imaging region in the direction of the arrow X1. At this time, as shown in FIG. 3B, the driving device 108 moves the stage 102 by a distance such that the imaging regions will overlap by a predetermined amount (region). In then performing shot number (2, 1), the imaging element 106 captures an image of imaging region (101, 2, 1) and obtains an image I (106, 2, 1); the spectrum detector 107 performs spectrum detection of detection region (107, 2, 1) and obtains a spectrum signal S (107, 2, 1). The region 210 shown in FIG. 3B is a region of overlap between the captured image I (106, 1, 1) and the captured image I (106, 2, 1) captured by the imaging element 106.

Similarly, the driving device 108 sequentially moves the stage 102 in the direction of the arrow X2, i.e. it moves the imaging region in the direction of the arrow X1. As shown in FIG. 3C, shot number (3, 1), . . . , shot number (n–1, 1), and shot number (n, 1) are then executed sequentially. The imaging element 106 captures images of imaging region (101, 3, 1), . . . , imaging region (101, n–1, 1), and imaging region (101, n, 1), and the spectrum detector 107 performs spectrum detection in detection region (107, 3, 1), . . . , detection region (107, n–1, 1), and detection region (107, n, 1) (n is an integer).

Figure 3D:
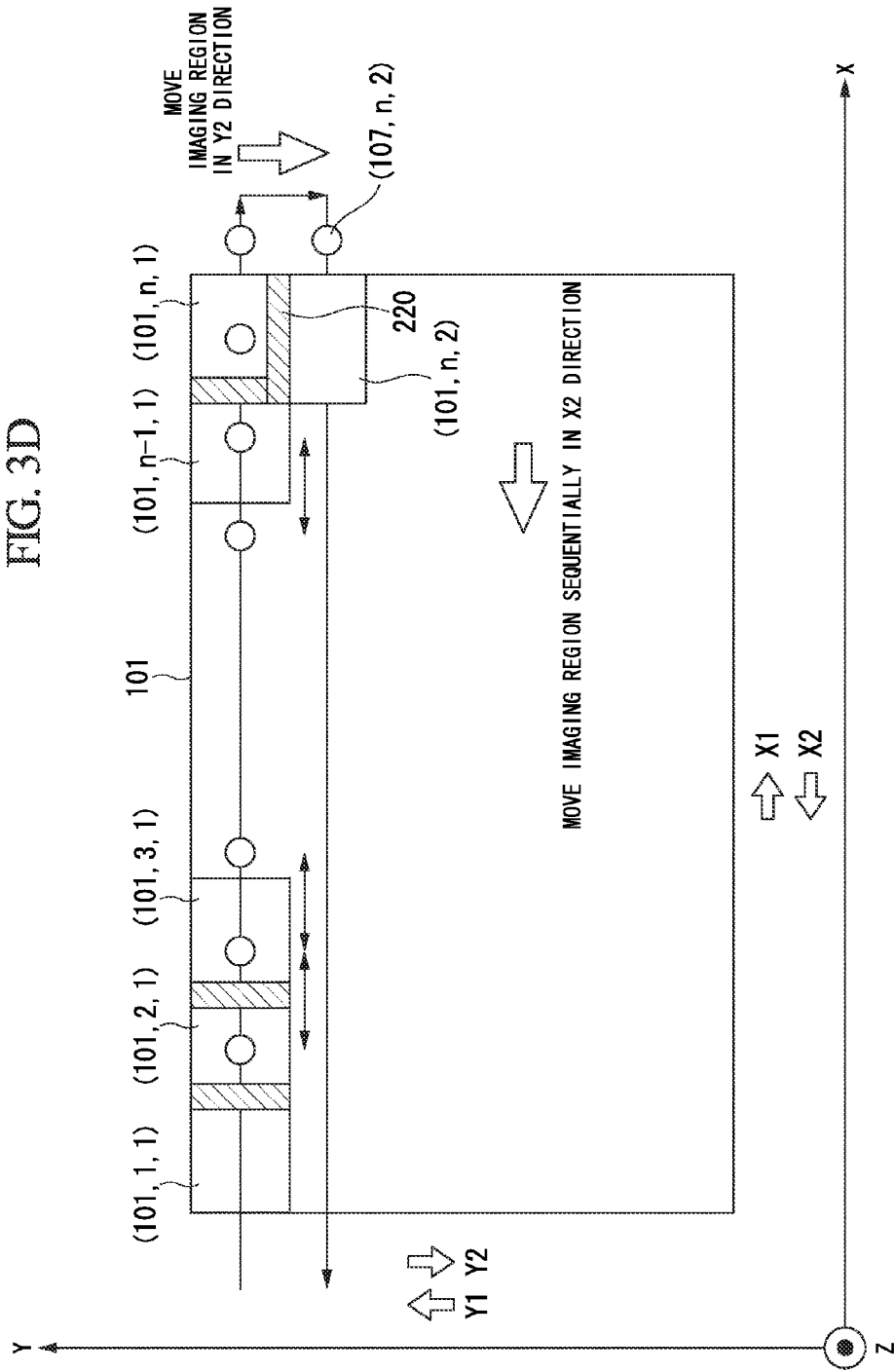

After shot number (n, 1) has been performed, the driving device 108 moves the stage 102 from the position where shot number (n, 1) was performed in the direction of the arrow Y1, i.e. it moves the imaging region in the direction of the arrow Y2. At this time, as shown in FIG. 3D, the driving device 108 moves the stage 102 by a distance such that the imaging regions will overlap by a predetermined amount (region). In shot number (n, 2), the imaging element 106 captures an image of imaging region (101, n, 1) and obtains an image I (106, n, 1); the spectrum detector 107 performs spectrum detection of detection region (107, n, 1) and obtains a spectrum signal S (107, n, 1). The region 210 shown in FIG. 3D is a region of overlap between the captured image I (106, n, 1) and the captured image I (106, n, 2) captured by the imaging element 106.

After shot number (n, 2) has been performed, the driving device 108 sequentially moves the stage 102 in the direction of the arrow X1, i.e. it moves the imaging region in the direction of the arrow X2. As shown in FIG. 3E, while the driving device 108 is sequentially moving the imaging region and the detection region, at each position of the stage 102, the imaging element 106 captures an image of the imaging region and the spectrum detector 107 performs spectrum detection in the detection region, obtaining a captured image I and a spectrum signal S at each position of the stage 102.

Lastly, the driving device 108 moves the stage 102 to a position for performing shot number (n, m), the imaging element 106 captures an image of the imaging region (101, n, m) and obtains an image I (106, n, m), the spectrum detector 107 performs spectrum detection of the detection region (107, n, m) and obtains a spectrum signal S (107, n m), whereby the imaging system 1 ends observation of the sample 101 (m is an integer).

As described above, in the imaging system 1, the sample 101 is divided into a plurality of regions and images of them are captured (in FIGS. 3A to 3E, shot number (1, 1) to shot number (n, m)). The correcting unit 109 then synthesizes the images (106, 1, 1) to (106, n, m) captured by the imaging element 106 to create an image of the whole sample 101. On the basis of spectrum information contained in spectrum signals S of detection regions that are in the sample 101, from among spectrum signal S (107, 1, 1) to spectrum signal S (107, n, m), the correcting unit 109 corrects the created image of the whole sample 101, and outputs a virtual slide. In this correction process, instead of using all the spectrum signals S obtained when the sample 101 was detected, the correcting unit 109 can use a predetermined number of spectrum signals S, or spectrum signals S obtained by detection at predetermined positions.

Figure 13:
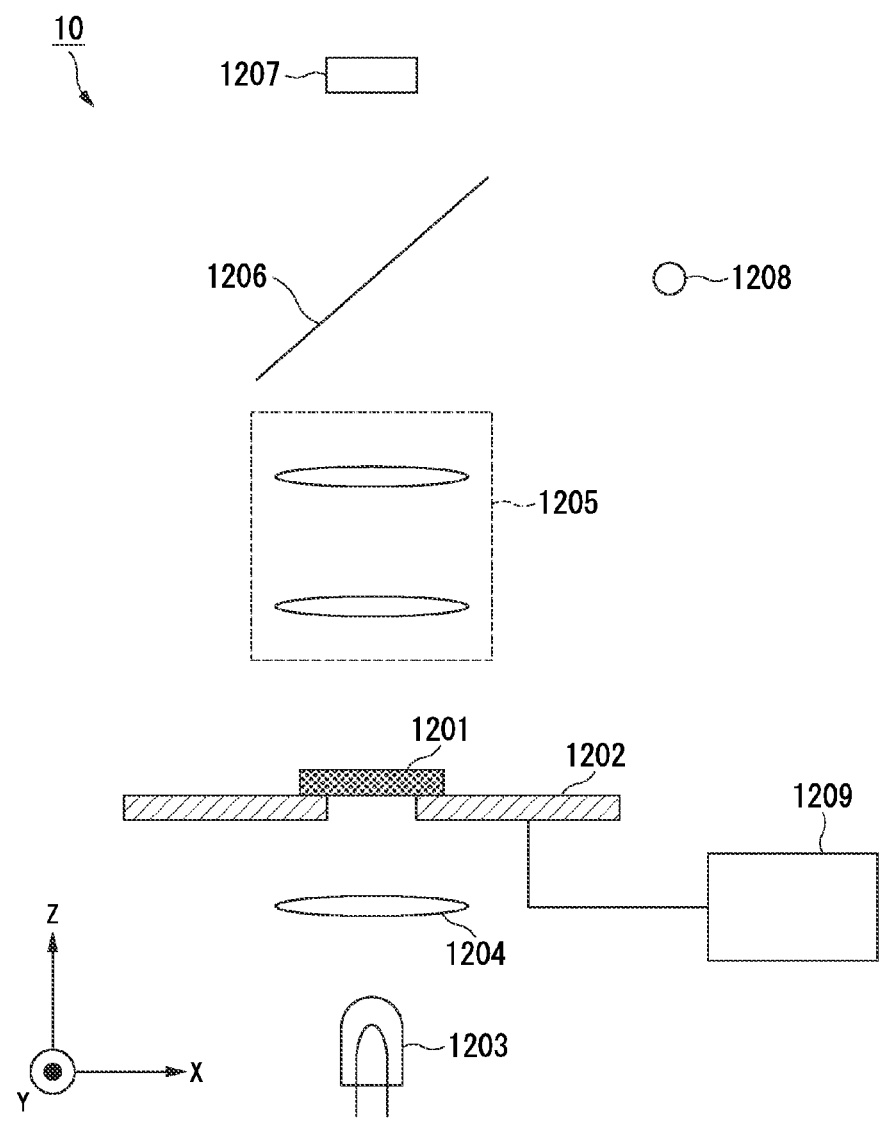
FIG. 13 is a view illustrating a schematic configuration of an imaging system in accordance with the related art.
Figure 14:
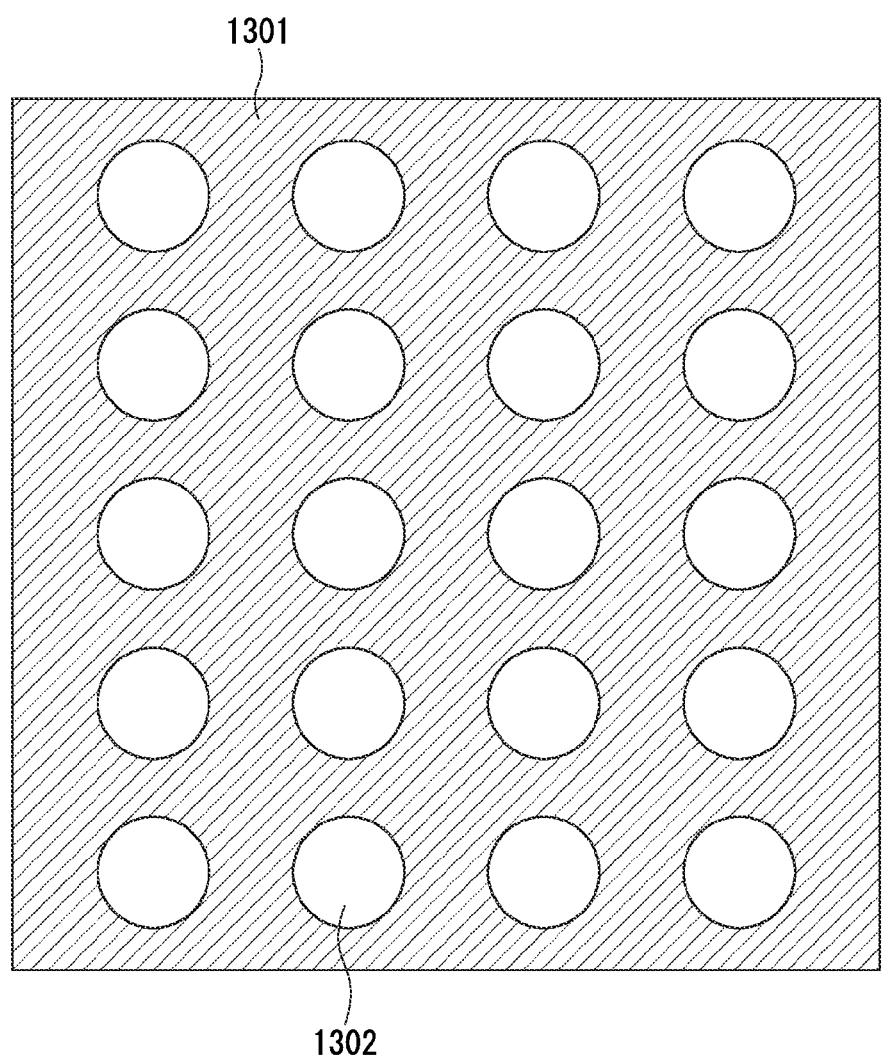
FIG. 14 is a pattern diagram illustrating a technology for enhancing a color reproduction characteristic of a captured image in accordance with the related art.

As described above, in the imaging system an accordance with the first preferred embodiment of the present invention, by arranging the imaging element 106 and the spectrum detector 107 such that they are adjacent to each other within the same focal plane 201, all the transmission light from the sample 101 that passes through the image-forming optical system 105 is irradiated to the imaging element 106 and the spectrum detector 107. That is, in the imaging system 1, the transmission light from the sample 101 is wholly incident to the imaging element 106 and the spectrum detector 107, rather than being divided by the optical path-dividing device 1206 as in the conventional imaging system 10 shown in FIG. 13. Thus more transmission light from the sample 101 is detected by the imaging element 106 and the spectrum detector 107. The spectrum signal S output from the spectrum detector 107 has a higher signal output, and the SNR of the spectrum signal S also increases.

In the imaging system 1 in accordance with the first preferred embodiment of the present invention, based on spectrum information contained in a plurality of spectrum signals S, the imaging element 106 can correct the image of the whole sample 101 captured by the imaging element 106. It is therefore possible to obtain an image of the whole sample 101 with enhanced color reproduction characteristic.

Second Preferred Embodiment

Figure 4:
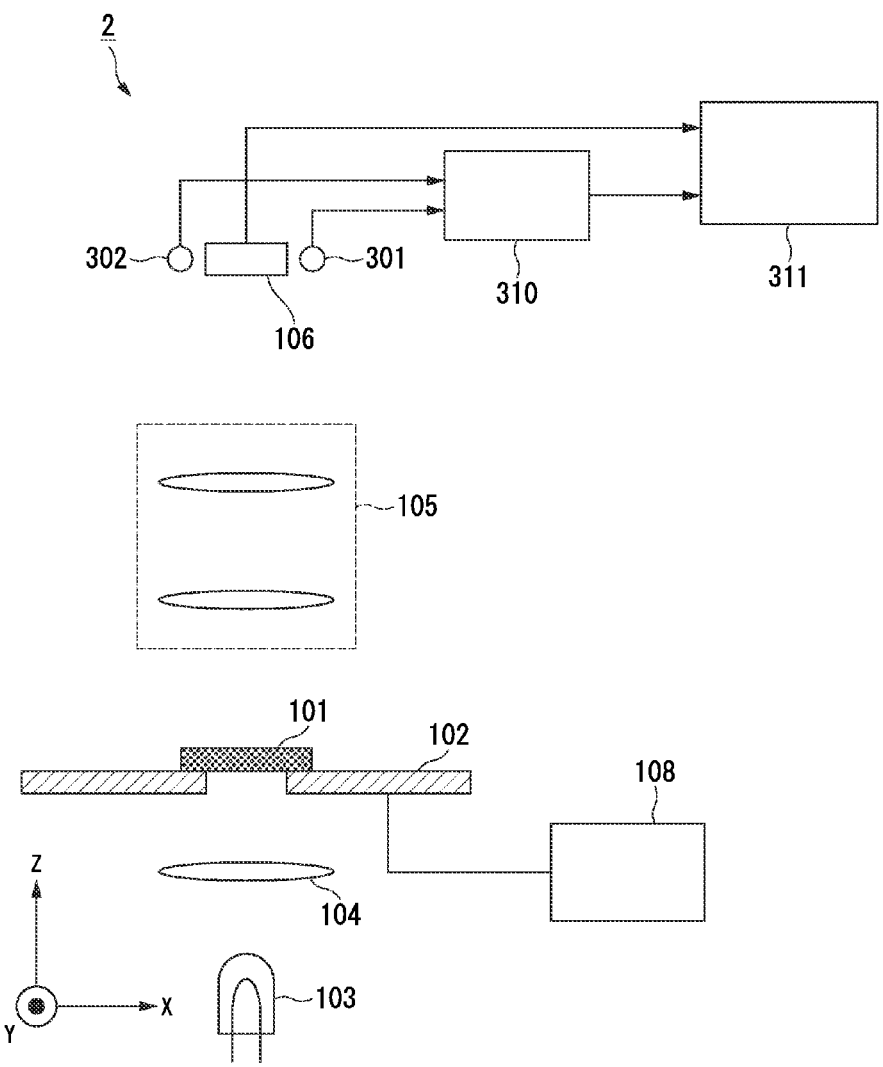
FIG. 4 is a diagram illustrating a schematic configuration of an imaging system in accordance with a second preferred embodiment of the present invention.

The imaging system in accordance with a second preferred embodiment of the present invention will be described. FIG. 4 is a diagram illustrating the schematic configuration of an imaging system in accordance with the second preferred embodiment of the present invention. An imaging system 2 in FIG. 4 includes a stage 102, a transmission light source 103, a condenser lens 104, an image-forming optical system 105, an imaging element 106, a spectrum detector 301, a spectrum detector 302, a driving device 108, a spectrum signal processing unit 310, and a correcting unit 311. The sample 101 shown in FIG. 4 is a sample to be observed by the imaging system 2 of the second embodiment, and is not a constituent element of the imaging system 2.

The imaging system 2 in accordance with the second preferred embodiment of the present invention includes, instead of the spectrum detector 107 in the imaging system 1 shown in FIG. 1, a spectrum detector 301 and a spectrum detector 302. It further includes a spectrum signal processing unit 310, and, instead of the correcting unit 109, a correcting unit 311. The operation of the other constitutive elements is roughly the same as the operation of the constitutive elements of the imaging system 1 shown in FIG. 1. Therefore, in the imaging system 2, constitutive elements which have similar operations to the constitutive elements in the imaging system 1 shown in FIG. 1 are designated with the same reference numerals, and only operational differences are explained.

Like the imaging system 1 shown in FIG. 1, the imaging system 2 divides the sample 101 to be observed into a plurality of regions and captures images of them; it then pastes the divided images (digital images) together to create a single digital image (virtual slide) of the whole sample with corrected color reproduction characteristic.

In the imaging system 2, two spectrum detectors 301 and 302 in the same focal plane as the imaging element 106 detect spectra at a plurality of points in the virtual slide. The imaging system 2 adds the spectrum signals output from each of the spectrum detectors 301 and 302, and, on the basis of spectrum information contained in the added spectrum signal, corrects the color reproduction characteristic of the virtual slide. The positional relationship of the imaging element 106, the spectrum detector 301, and the spectrum detector 302 in the focal plane will be explained later. The movement of the stage 102 required to add the spectrum signals (i.e. the driving of the stage 102 by the driving device 108) will also be described later.

The spectrum detectors 301 and 302 each detect the spectrum of transmission light from the sample 101 in a predetermined region in the focal plane. The spectrum signals obtained by the spectrum detectors 301 and 302 are each outputted to the spectrum signal processing unit 310. The spectrum signal processing unit 310 adds the spectrum signal inputted from the spectrum detector 301 to the spectrum signal inputted from the spectrum detector 302. The image captured by the imaging element 106, and the spectrum signal added by the spectrum signal processing unit 310 (which is hereinafter referred to as an 'added spectrum signal SP') are outputted to the correcting unit 311. On the basis of spectrum information contained in the added spectrum signal SP inputted from the spectrum signal processing unit 310, the correcting unit 311 corrects the image captured by the imaging element 106, and outputs it as a virtual slide in the imaging system 2.

The spectrum signal processing unit 310 can be provided at a distance from the spectrum detectors 301 and 302, which each transmit the spectrum signals they obtain to the spectrum signal processing unit 310; the spectrum signal processing unit 310 then adds the spectrum signals it received. Like the correcting unit 109 shown in FIG. 1, the correcting unit 311 can be provided at a distance from the imaging element 106 and the spectrum signal processing unit 310; the imaging element 106 and the spectrum signal processing unit 310 transmit the captured image and the added spectrum signal SP to the correcting unit 311, which corrects the captured image based on the spectrum information contained in the added spectrum signal SP it received.

Figure 5:
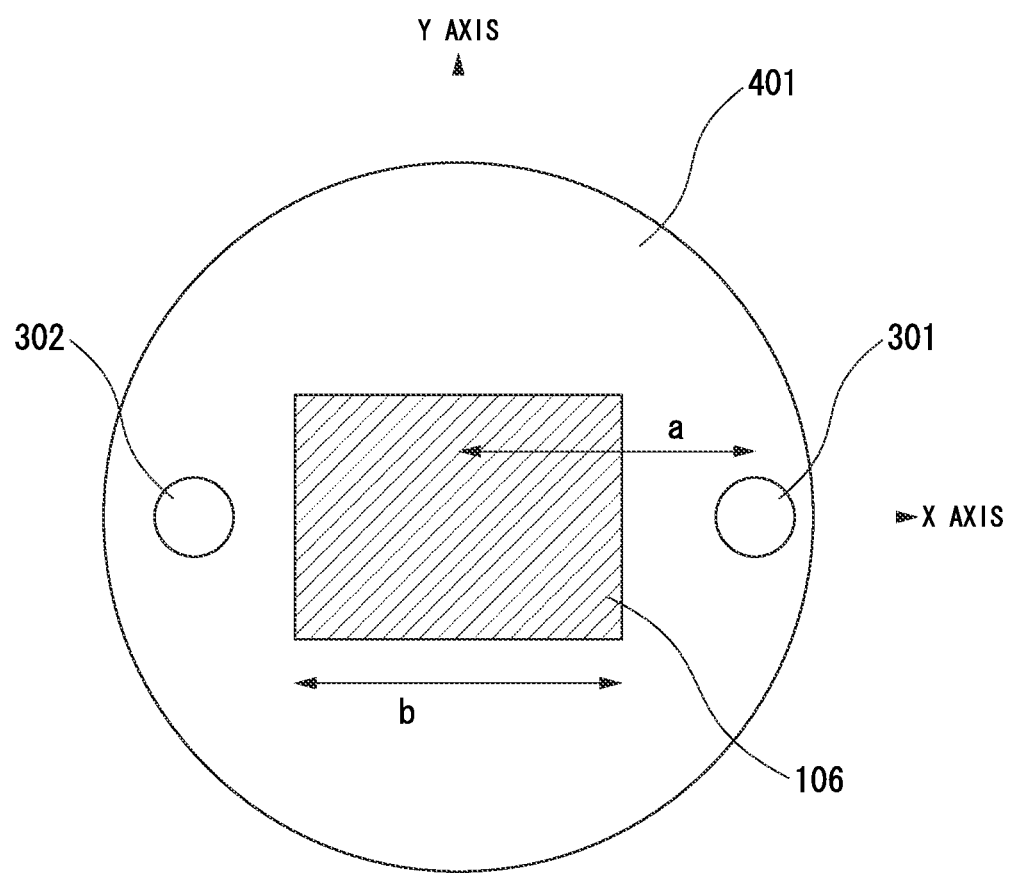
FIG. 5 is a schematic diagram illustrating an example of a positional relationship between the imaging element and the spectrum detectors in a focal plane of the imaging system in accordance with the second preferred embodiment of the present invention.

The positional relationship between the imaging element 106, the spectrum detector 301, and the spectrum detector 302 in the imaging system 2 in accordance with the second preferred embodiment of the present invention will be described. FIG. 5 is a schematic diagram illustrating an example of the positional relationship between the imaging element 106, the spectrum detector 301, and the spectrum detector 302 in a focal plane of the imaging system 2 in accordance with the second preferred embodiment of the present invention. FIG. 5 shows the position of a focal plane 401 formed by the image-forming optical system 105 of the imaging system 2, the position of the imaging element 106, the position of the spectrum detector 301, and the position of the spectrum detector 302. Simultaneously, FIG. 5 shows a region in the focal plane 401 where the imaging element 106 captures an image, a region where the spectrum detector 301 detects a spectrum, and a region where the spectrum detector 302 detects a spectrum.

The X-axis shown in FIG. 5 is parallel to the X-axis direction which the stage 102 moves in, and also passes through the center of the imaging element 106, in the focal plane 401. The Y-axis shown in FIG. 5 is parallel to the Y-axis direction which the stage 102 moves in, and also passes through the center of the imaging element 106, in the focal plane 401. That is, the X-axis and the Y-axis shown in FIG. 5 intersect each other orthogonally, and the point where they intersect is the center of the imaging element 106.

As shown in FIG. 5, in the imaging system 2, the spectrum detectors 301 and 302 are arranged such that each is adjacent to the imaging element 106. More specifically, the spectrum detectors 301 and 302 are parallel to the X-axis and symmetrical to the Y-axis. The position of each of the spectrum detector 301 and the spectrum detector 302 satisfies the relationship shown in equation (1) below.

$$(b/2) < a < b \tag{1}$$

In equation (1), a is the distance from the Y-axis to the spectrum detector 301 (or the spectrum detector 302), and b is the length of one side of the imaging element 106 in the X-axis direction.

An operation of the imaging system 2 in accordance with the second preferred embodiment of the present invention will be described. FIGS. 6A to 6F are schematic diagrams illustrating examples of the positional relationship between a region that the imaging element 106 captures an image of, and regions that the spectrum detector 301 and the spectrum detector 302 detect. FIGS. 6A to 6F simultaneously show the sample 101 disposed on the stage 102, a region where the imaging element 106 captures an image of the sample 101, and regions where the spectrum detector 301 and the spectrum detector 302 detect spectra.

In the imaging system 2, to divide the sample 101 into a plurality of regions for capturing images, the driving device 108 drives the stage 102 in the X-axis direction and in the Y-axis direction. Each time the stage 102 moves by a predetermined amount (distance), the imaging element 106 captures an image of a region of a part of the transmission light on the sample 101 in the focal plane 401. The spectrum detector 301 and the spectrum detector 302 each detect the spectrum of a region of a part of the transmission light on the sample 101 in the focal plane 401.

The driving device 108 controls the amount of movement of the stage 102 such that the correcting unit 311 can synthesize the images captured by the imaging element 106 and thereby create a captured image of the whole sample 101. The driving device 108 controls the amount of movement of the stage 102 such that the spectrum signal processing unit 310 can create an added spectrum signal SP by adding the spectrum signals inputted from each of the spectrum detectors 301 and 302. That is, the driving device 108 controls the distance that the stage 102 moves in the X-axis and Y-axis directions, adjusting it such that the imaging regions of the sample 101 that the imaging element 106 captures images of are overlapping or adjacent to each other, and that the detection region of the sample 101 detected by the spectrum detectors 301 matches the detection region of the sample 101 detected by the spectrum detector 302.

More specifically, in the imaging system 2, since the imaging element 106, the spectrum detector 301, and the spectrum detector 302 are arranged as shown in FIG. 5, and their positional relationship is the one expressed in equation (1), the driving device 108 sets the interval of the distance for moving the stage 102 in the X-axis direction as distance a in the focal plane 401. In the imaging system 2, since the magnification of the sample 101 in the image-forming optical system 105 is P, the distance a in the focal plane 401 is a distance magnified by P. Therefore, in the imaging system 2, the distance that the driving device 108 actually moves the stage 102 in the X-axis direction becomes a/P. The driving device 108 sets the distance a/P as the movement interval when moving the stage 102 in the X-axis direction.

As in the example of the operation of the imaging system 1 shown in FIGS. 3A to 3E, the following explanation describes an example of an operation where an adjustment is made such that the imaging regions overlap. As in the explanation of FIGS. 3A to 3E, the regions of the sample 101 that the imaging element 106 captures images of, the regions of the sample 101 that the spectrum detector 301 and the spectrum detector 302 detect, the images and spectrum signals obtained by imaging and detection, and the like, are designated using reference codes of constitutive elements that perform the operation, and XY coordinates indicating their positions.

For example, the imaging region of the sample 101 captured by the imaging element 106 is expressed as 'imaging region (101, X, Y)'. The detection region detected by the spectrum detector 301 is expressed as 'detection region (301, X, Y)', and the detection region detected by the spectrum detector 302 is expressed as 'detection region (302, X, Y)'. The imaging operation wherein the imaging element 106 captures an image of imaging region (101, X, Y), the detection operation wherein the spectrum detector 301 detects the detection region (301, X, Y), and the detection operation wherein the spectrum detector 302 detects the detection region (302, X, Y) are expressed as 'shot number (X, Y)'.

The image of the imaging region (101, X, Y) captured by the imaging element 106 according to shot number (X, Y) is expressed as 'captured image I (106, X, Y)'. The spectrum signal obtained when the spectrum detector 301 detects the detection region (301, X, Y) is expressed as 'spectrum signal S (301, X, Y)', and the spectrum signal obtained when the spectrum detector 302 detects the detection region (302, X, Y) is expressed as 'spectrum signal S (302, X, Y)'. X is an integer expressing a position in the X-axis direction, and Y is an integer expressing a position in the Y-axis direction.

The operation of the imaging system 2 will be described more concretely. Firstly, as shown in FIG. 6A, when the imaging system 2 starts its observation of the sample 101, at shot number (1, 1), the imaging element 106 captures an image of an imaging region (101, 1, 1) and obtains a captured image I (106, 1, 1). The spectrum detector 301 performs spectrum detection of the detection region (301, 1, 1), and obtains a spectrum signal S (301, 1, 1), and the spectrum detector 302 performs spectrum detection of the detection region (302, 1, 1), and obtains a spectrum signal S (302, 1, 1). The position of the stage 102 for performing shot number (1, 1) is termed 'initial stage position'.

The driving device 108 then moves the stage 102 from the initial stage position in the direction of the arrows X2, i.e. it moves the imaging region in the direction of the arrow X1. At this time, as shown in FIG. 6B, the driving device 108 moves the stage 102 by the distance a/P. Consequently, the imaging region of the imaging element 106 and the detection regions of the spectrum detectors 301 and 302 move relatively by a distance a/P in the direction of the arrow X1. In then performing shot number (2, 1), the imaging element 106 captures an image of imaging region (101, 2, 1) and obtains an image I (106, 2, 1). The spectrum detector 301 performs spectrum detection of detection region (301, 2, 1) and obtains a spectrum signal S (301, 2, 1), and the spectrum detector 302 performs spectrum detection of detection region (302, 2, 1) and obtains a spectrum signal S (302, 2, 1).

The region 501 shown in FIG. 6B is one where the captured image I (106, 1, 1) and the captured image I (106, 2, 1) captured by the imaging element 106 overlap with each other. The distance of the overlap between these imaging regions I in the X-axis direction is determined from the difference between the length b and the distance a, and the magnification P.

The driving device 108 then moves the stage 102 from the position where it performed the shot number (2, 1) in the direction of the arrow X2 (i.e. it moves the imaging region in the direction of the arrow X1) by a further distance of a/P. As a result, as shown in FIG. 6A, the imaging region of the imaging element 106, and the detection regions of the spectrum detectors 301 and 302 move relatively in the direction of the arrow X1 by a further distance of a/P. A shot number (3, 1) is performed, and the imaging element 106 captures an image of imaging region (101, 3, 1) to obtain a captured image (106, 3, 1). The spectrum detector 301 detects the spectrum of a detection region I (301, 3, 1) to obtain a spectrum signal S (301, 3, 1), and the spectrum detector 302 detects the spectrum of a detection region I (302, 3, 1) to obtain a spectrum signal S (302, 3, 1).

In FIG. 6C, the region 502 indicated by a black circle is a region of overlap between the detection region (301, 1, 1) where the spectrum detector 301 performed spectrum detection in shot number (1, 1), and the detection region (302, 3, 1) where the spectrum detector 302 performed spectrum detection in shot number (3, 1).

Similarly, the driving device 108 sequentially moves the stage 102 in the direction of the arrow X2 (i.e. it moves the imaging region in the direction of the arrow X1) at a distance of a/P each time. Thus the imaging region of the imaging element 106 and the detection regions of the spectrum detector 301 and the spectrum detector 302 relatively move sequentially by a distance of a/P in the direction of the arrow X2. As shown in FIG. 6D, following shot number (3, 1), ..., shot number (n−1, 1), and shot number (n, 1) are then performed sequentially, whereby the imaging element 106, after capturing an image of the image region (101, 3, 1), captures images of ..., imaging region (101, n−1, 1), and imaging region (101, n, 1). The spectrum detector 301, after detecting a detection region (301, 3, 1), detects ..., a detection region (301, n−1, 1), and a detection region (301, n, 1), and the spectrum detector 302, after detecting a detection region (302, 3, 1), detects ..., a detection region (302, n−1, 1), and a detection region (302, n, 1) (n is an integer).

In FIG. 6D also, the regions indicated by black circles are regions of overlap between the detection regions where the spectrum detector 301 and the spectrum detector 302 performed spectrum detection. More specifically, in addition to the region 502 in FIG. 6D, there are overlap regions between the detection region (301, 2, 1) and detection region (302, 4, 1), between the detection region (301, 3, 1) and detection region (302, 5, 1), ..., between the detection region (301, n−3, 1) and detection region (302, n−1, 1), and between the detection region (301, n−2, 1) and detection region (302, n, 1).

After shot number (n, 1) has been performed, the driving device 108 moves the stage 102 from the position where the shot number (n, 1) was performed in the direction of the arrow Y1 (i.e. it moves the imaging region in the direction of the arrow Y2). At this time, as shown in FIG. 6E, the driving device 108 moves the stage 102 by a distance such that the imaging regions overlap by a predetermined amount (region).

Consequently, the imaging region of the imaging element 106 and the detection regions of the spectrum detectors 301 and 302 move relatively in the direction of the arrow Y2. In then performing shot number (n, 2), the imaging element 106 captures an image of imaging region (101, n, 2) and obtains an image I (106, n, 2). The spectrum detector 301 performs spectrum detection of detection region (301, n, 2) and obtains a spectrum signal S (301, n, 2), and the spectrum detector 302 performs spectrum detection of detection region (302, n, 2) and obtains a spectrum signal S (302, n, 2).

Figure 6E:
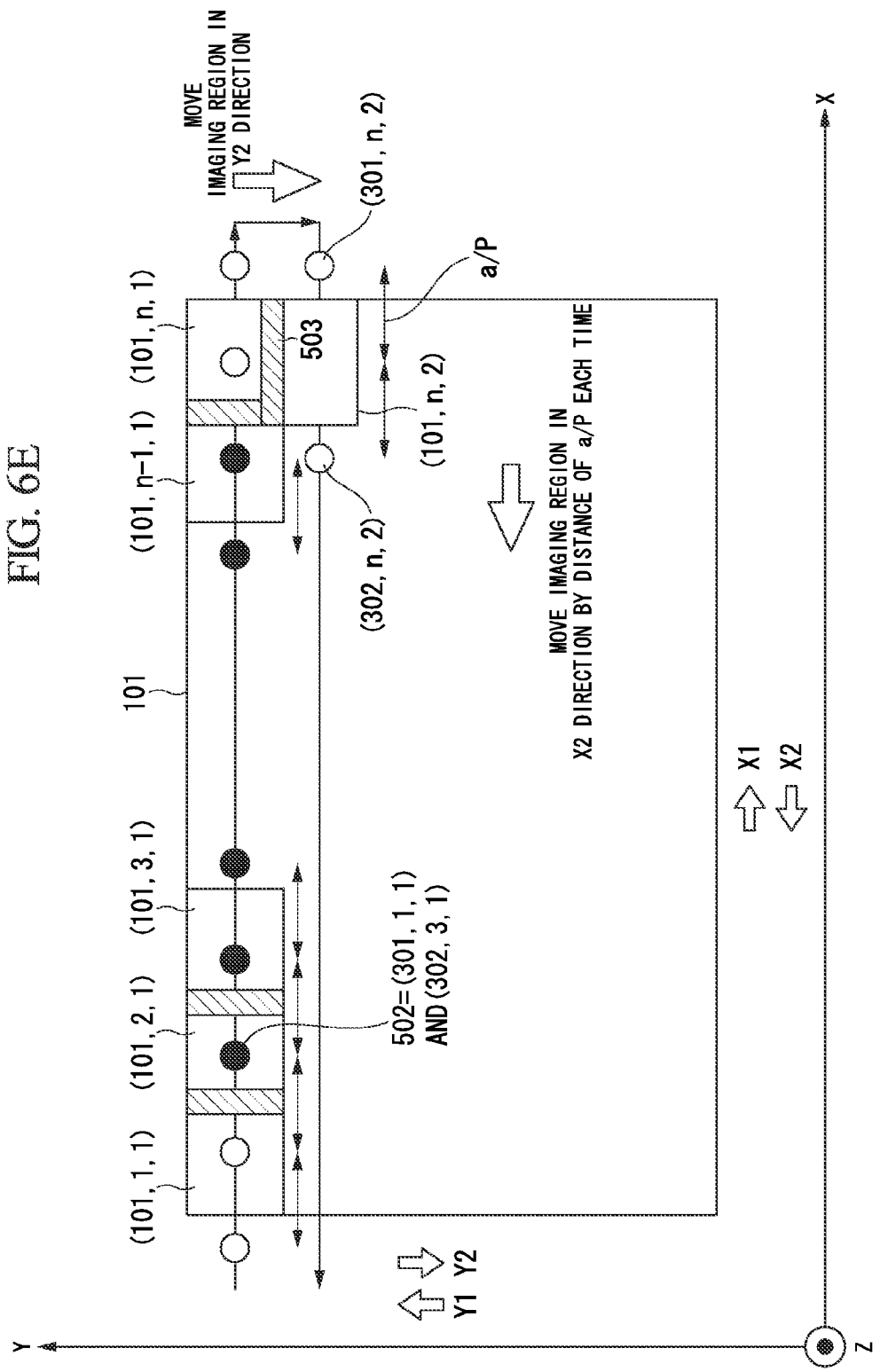

In FIG. 6E, the region 503 is a region of overlap between the captured image I (106, n, 1) and the captured image I (106, n, 2) captured by the imaging element 106.

After shot number (n, 2) has been performed, the driving device 108 sequentially moves the stage 102 in the direction of the arrow X1 (i.e. it moves the imaging region in the direction of the arrow X2) at a distance of a/P each time. Thus the imaging region of the imaging element 106 and the detection regions of the spectrum detector 301 and the spectrum detector 302 relatively move sequentially by a distance of a/P each time in the direction of the arrow X2.

Following shot number (n, 2), ..., shot number (n−1, 2), shot number (n−2, 2), ..., and shot number (n, 1) are performed sequentially, whereby the imaging element 106, after capturing an image of the image region (101, n, 2), captures images of imaging region (101, n−1, 2), imaging region (101, n−2, 2), ..., and imaging region (101, 1, 2). The spectrum detector 301, after detecting a detection region (301, n, 2), detects a detection region (301, n−1, 2), a detection region (301, n−2, 2), ..., and a detection region (301, 1, 2), and the spectrum detector 302, after detecting a detection region (302, n, 2), detects a detection region (302, n−1, 2), a detection region (302, n−2, 2), ..., and a detection region (302, 1, 2) (n is an integer).

As shown in FIG. 6F, while the driving device 108 is sequentially moving the imaging region and the detection region, at each position of the stage 102, the imaging element 106 captures an image of the imaging region and the spectrum detectors 301 and 302 perform spectrum detection in the detection regions, obtaining a captured image I and spectrum signals S at each position of the stage 102.

Lastly, the driving device 108 moves the stage 102 to a position for performing shot number (n, m), the imaging element 106 captures an image of the imaging region (101, n, m) and obtains an image I (106, n, m), the spectrum detector 301 performs spectrum detection of the detection region (301, n, m) and obtains a spectrum signal S (301, n m), and the spectrum detector 302 performs spectrum detection of the detection region (302, n, m) and obtains a spectrum signal S (302, n m), whereby the imaging system 2 ends observation of the sample 101 (m is an integer).

As described above, in the imaging system 2, the sample 101 is divided into a plurality of regions and images of them are captured (in FIGS. 6A to 6F, shot number (1, 1) to shot number (n, m)). From among spectrum signal S (301, 1, 1) to spectrum signal S (301, n, m), and spectrum signal S (302, 1, 1) to spectrum signal S (302, n, m), the spectrum signal processing unit 310 adds the spectrum signals S obtained from regions of overlap between the detection regions of the spectrum detector 301 and the detection regions of the spectrum detector 302, for each detection region.

For example, in the example operation of the imaging system 2 described in FIGS. 6A to 6F, the spectrum signal processing unit 310 adds each of spectrum signal S (301, 1, 1) and spectrum signal S (302, 3, 1), spectrum signal S (301, 2, 1) and spectrum signal S (302, 4, 1), ..., spectrum signal S (301, j, j) and spectrum signal S (302, j+2, j), ..., and spectrum signal S (301, n−2, m) and spectrum signal S (302, n, m), to create added spectrum signals SP (j is an integer). It then outputs the added spectrum signal SP of each detected region to the correcting unit 311.

The correcting unit 311 then synthesizes the images (106, 1, 1) to (106, n, m) captured by the imaging element 106 to create an image of the whole sample 101. On the basis of spectrum information contained in the added spectrum signals SP inputted from the spectrum signal processing unit 310, the correcting unit 311 corrects the created image of the whole sample 101, and outputs it as a virtual slide of the sample 101 as observed by the imaging system 2. Instead of using all the spectrum signals S inputted from the spectrum signal processing unit 310, the correcting unit 311 can perform the correction process using a predetermined number of added spectrum signals SP, or added spectrum signals SP obtained by detection at predetermined positions.

As described above, in the imaging system 2 of the second embodiment, by disposing the imaging element 106 and the spectrum detectors 301 and 302 such that they are adjacent to each other within the same focal plane 201, as in the imaging system 1 shown in FIG. 1, all the transmission light from the sample 101 that passes through the image-forming optical system 105 is irradiated to the imaging element 106 and the spectrum detectors 301 and 302. A greater quantity of transmission light from the sample 101 is thus detected by the imaging element 106 and the spectrum detectors 301 and 302.

Moreover, in the imaging system 2 of the second embodiment, the spectrum signal processing unit 310 adds the spectrum signals S obtained from the detection regions of the spectrum detector 301 and the spectrum detector 302. The added spectrum signal SP thereby obtained has an enhanced signal quantity (S) that is twice that of a spectrum signal S obtained by spectrum detection from one of the spectrum detector 301 and the spectrum detector 302, and a noise quantity (N) that is the square root of twice. Therefore, the SNR of the added spectrum signal SP is enhanced to the square root of twice that of the spectrum signal S.

In the imaging system 2 of the second embodiment, on the basis of spectrum information contained in the plurality of added spectrum signals SP with enhanced SNR, the correcting unit 311 can correct the image of the whole sample 101 captured by the imaging element 106. An image of the whole sample 101 with enhanced color reproduction characteristic can be thereby obtained.

Third Preferred Embodiment

Subsequently, an imaging system in accordance with a third preferred embodiment of the present invention will be described. FIG. 7 is a diagram illustrating the schematic configuration of an imaging system in accordance with a second preferred embodiment of the present invention. An imaging system 3 in FIG. 7 includes a stage 102, a transmission light source 103, a condenser lens 104, an image-forming optical system 105, an imaging element 106, a spectrum detector 301, a spectrum detector 302, a spectrum detector 303, a spectrum detector 304, a driving device 108, a spectrum signal processing unit 320, and a correcting unit 311. The sample 101 shown in FIG. 7 is a sample to be observed by the imaging system 3 in accordance with the second preferred embodiment of the present invention, and is not a constituent element of that imaging system 3.

The imaging system 3 in accordance with the third preferred embodiment of the present invention additionally includes, in the configuration of the imaging system 2 shown in FIG. 4, a spectrum detector 303 and a spectrum detector 304, and includes a spectrum signal processing unit 320 instead of the spectrum signal processing unit 310. The operation of the other constitutive elements is roughly the same as the operation of those in the imaging system 2 shown in FIG. 4. Therefore, in the imaging system 3, constitutive elements which have similar operations to those in the imaging system 2 shown in FIG. 4 are designated with the same reference numerals, and only operational differences are explained.

Like the imaging system 2 shown in FIG. 4, the imaging system 3 divides the sample 101 to be observed into a plurality of regions and captures images of them; it then pastes the divided images (digital images) together to create a single digital image (virtual slide) of the whole sample with corrected color reproduction characteristic.

However, in the imaging system 3, four spectrum detectors (spectrum detector 301, spectrum detector 302, spectrum detector 303, and spectrum detector 304) in the same focal plane as the imaging element 106 detect spectra at a plurality of points in the virtual slide. The imaging system 3 adds the spectrum signals output from the spectrum detectors, and, on the basis of spectrum information contained in the added spectrum signal, corrects the color reproduction characteristic of the virtual slide. The positional relationships of the imaging element 106 and the spectrum detectors in the focal plane will be described later. The movement of the stage 102 required to add the spectrum signals (i.e. the driving of the stage 102 by the driving device 108) will also be described later.

The spectrum detectors 301 to 304 each detect the spectrum of transmission light from the sample 101 in a predetermined region in the focal plane. The spectrum signals obtained by the spectrum detectors are each outputted to the spectrum signal processing unit 320. The spectrum signal processing unit 320 adds the spectrum signal inputted from the spectrum detector 301, the spectrum signal inputted from the spectrum detector 302, the spectrum signal inputted from the spectrum detector 303, and the spectrum signal inputted from the spectrum detector 304, creating an added spectrum signal SP. The image captured by the imaging element 106, and the added spectrum signal SP created by the spectrum signal processing unit 320 are outputted to the correcting unit 311. On the basis of spectrum information contained in the added spectrum signal SP inputted from the spectrum signal processing unit 320, the correcting unit 311 corrects the image captured by the imaging element 106, and outputs it as a virtual slide in the imaging system 3.

Like the spectrum signal processing unit 310 shown in FIG. 4, the spectrum signal processing unit 320 can be provided at a distance from the spectrum detectors, which each transmit the spectrum signals they obtain to the spectrum signal processing unit 320; the spectrum signal processing unit 320 then adds the spectrum signals it received. Like the correcting unit 311 shown in FIG. 4, the correcting unit 311 can be provided at a distance from the imaging element 106 and the spectrum signal processing unit 320; the imaging element 106 and the spectrum signal processing unit 320 transmit the captured image and the added spectrum signal SP to the correcting unit 311, which corrects the captured image based on the spectrum information contained in the added spectrum signal SP it received.

Figure 8:
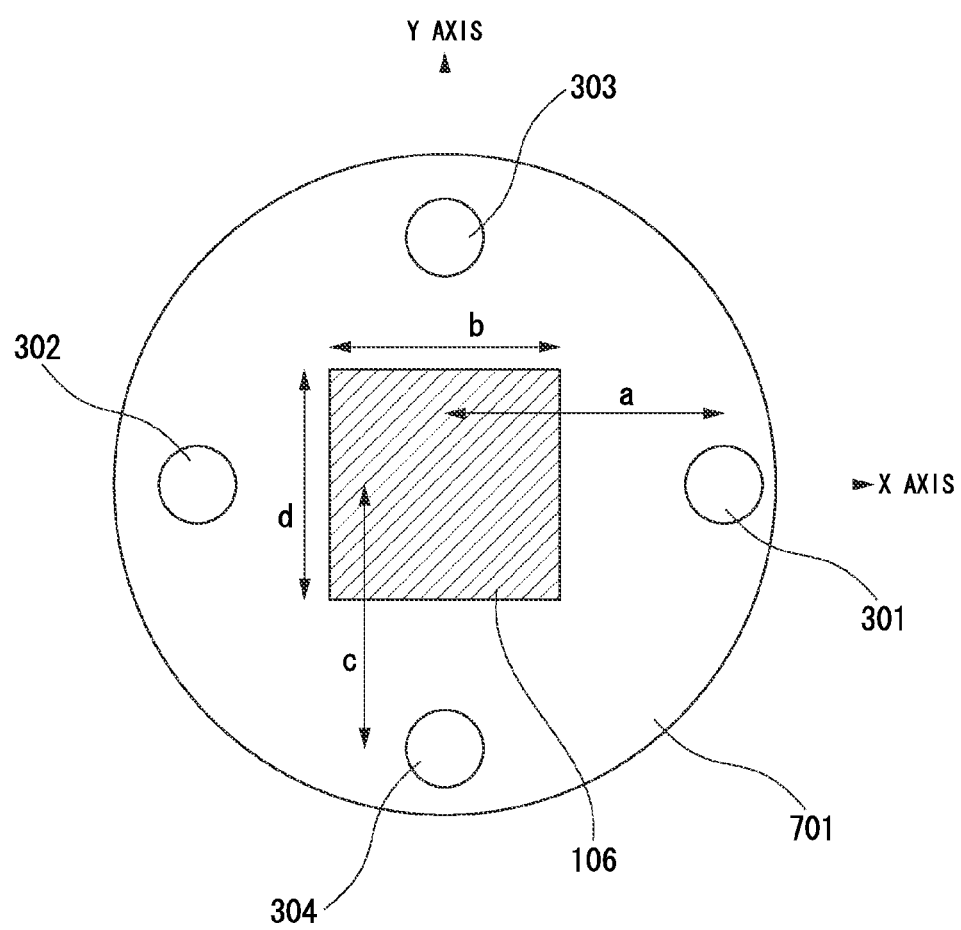
FIG. 8 is a schematic diagram illustrating an example of the positional relationship between the imaging element and each of the spectrum detectors in a focal plane of the imaging system in accordance with the third preferred embodiment of the present invention.

The positional relationship between the imaging element 106 and the spectrum detectors in the imaging system 3 in accordance with the third preferred embodiment of the present invention will be described. FIG. 8 is a schematic diagram illustrating an example of the positional relationship between the imaging element 106 and each of the spectrum detectors in a focal plane of the imaging system 3 in accordance with the third preferred embodiment of the present invention. FIG. 8 shows the position of a focal plane 701 formed by the image-forming optical system 105 of the imaging system 3, the position of the imaging element 106, the position of the spectrum detector 301, and the position of the spectrum detector 302. Simultaneously, FIG. 8 shows a region in the focal plane 701 where the imaging element 106 captures an image, a region where the spectrum detector 301 detects a spectrum, a region where the spectrum detector 302 detects a spectrum, a region where the spectrum detector 303 detects a spectrum, and a region where the spectrum detector 304 detects a spectrum.

In the same manner as the X-axis and the Y-axis shown in FIG. 5, the X-axis and the Y-axis shown in FIG. 8 intersect each other orthogonally, and the point where they intersect is the center of the imaging element 106.

As shown in FIG. 8, in the imaging system 3, the spectrum detectors are provided adjacent to the imaging element 106. The positional relationship between the imaging element 106 and the spectrum detectors will be described later. The spectrum detector 301 and the spectrum detector 302 are arranged in similar positions to those in the imaging system 2 shown in FIG. 5, and for that reason will not be repetitiously described.

The spectrum detector 303 and the spectrum detector 304 are each parallel to the Y-axis and symmetrical to the X-axis. The position of each of the spectrum detector 303 and the spectrum detector 304 satisfies the relationship shown in equation (2) below.

$$(d/2) < c < d \tag{2}$$

In equation (2), c is the distance from the Y-axis to the spectrum detector 303 (or the spectrum detector 304), and d is the length of one side of the imaging element 106 in the Y-axis direction.

Figure 9A:
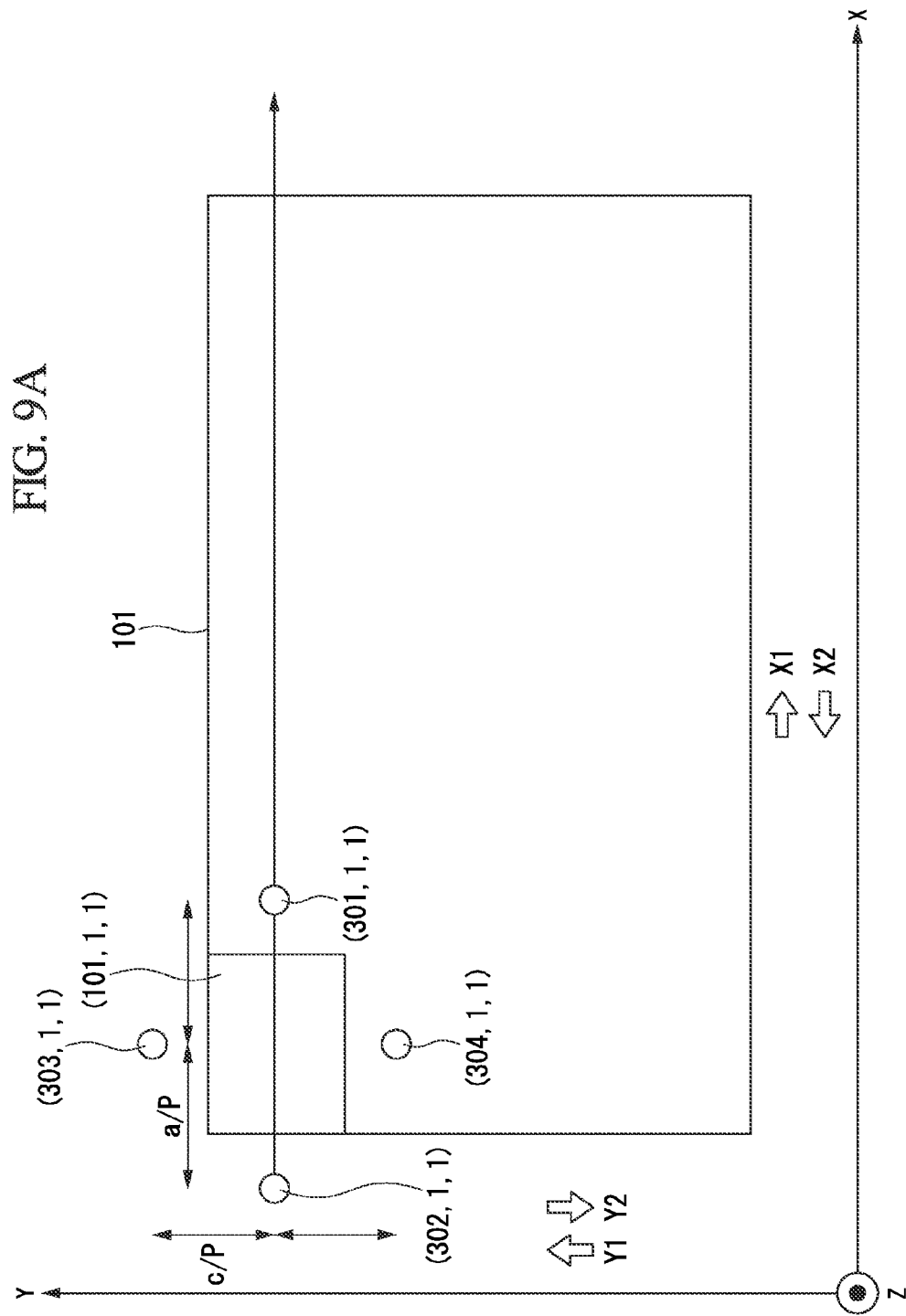

An operation of the imaging system 3 in accordance with the third preferred embodiment of the present invention will be described. FIGS. 9A to 9G are schematic diagrams illustrating examples of positional relationships between regions that the imaging element 106 captures an image of, and regions detected by the spectrum detector 301, the spectrum detector 302, the spectrum detector 303, and the spectrum detector 304. FIGS. 9A to 6G simultaneously show the sample 101 disposed on the stage 102, a region where the imaging element 106 captures an image of the sample 101, and regions where the spectrum detector 301, the spectrum detector 302, the spectrum detector 303, and the spectrum detector 304 detect spectra.

In the imaging system 3, to divide the sample 101 into a plurality of regions for capturing images, the driving device 108 drives the stage 102 in the X-axis direction and in the Y-axis direction. Each time the stage 102 moves by a predetermined amount (distance), the imaging element 106 captures an image of a region of a part of the transmission light on the sample 101 in a focal plane 701. Each of the spectrum detectors 301 to 304 detects the spectrum of a region of a part of the transmission light on the sample 101 in the focal plane 701.

The driving device 108 controls the amount of movement of the stage 102 such that the correcting unit 311 can synthesize the images captured by the imaging element 106 and thereby create a captured image of the whole sample 101. The driving device 108 controls the amount of movement of the stage 102 such that a spectrum signal processing unit 320 can create an added spectrum signal SP by adding the spectrum signals inputted from each of the spectrum detectors 301 to 304. That is, the driving device 108 controls the distance that the stage 102 moves in the X-axis and Y-axis directions, adjusting it such that the imaging regions of the sample 101 that the imaging element 106 captures images of are overlapping or adjacent to each other, and that the detection region of the sample 101 detected by the spectrum detectors 301, the detection region of the sample 101 detected by the spectrum detector 302, the detection region of the sample 101 detected by the spectrum detector 303, and the detection region of the sample 101 detected by the spectrum detector 304 all match.

More specifically, in the imaging system 3, since the imaging element 106, the spectrum detector 301, and the spectrum detector 302 are arranged as shown in FIG. 8, and their positional relationship is the one expressed in equation (1), the driving device 108 sets the interval of the distance for moving the stage 102 in the X-axis direction as distance a in the focal plane 401. On the other hand, since the imaging element 106, the spectrum detector 303, and the spectrum detector 304 are arranged as shown in FIG. 8, and their positional relationship is the one expressed in equation (2), the driving device 108 sets the interval of the distance for moving the stage 102 in the X-axis direction as distance c in the focal plane 701.

In the imaging system 3, since the magnification of the sample 101 in the image-forming optical system 105 is P, the distance a and the distance c in the focal plane 701 are distances magnified by P. Therefore, in the imaging system 3, the distance in the X-axis direction that the driving device 108 actually moves the stage 102 becomes a/P, and the distance in the Y-axis direction that the driving device 108 actually moves the stage 102 becomes c/P. The driving device 108 sets the distance a/P as the movement interval when moving the stage 102 in the X-axis direction, and sets the distance c/P as the movement interval when moving the stage 102 in the Y-axis direction.

As in the example of the operation of the imaging system 2 shown in FIG. 6, the following explanation describes an example of an operation where an adjustment is made such that the imaging regions overlap. As in the explanation of FIG. 6, the regions of the sample 101 that the imaging element 106 captures images of, the regions of the sample 101 that the spectrum detectors detect, the images and spectrum signals obtained by imaging and detection, and the like, are designated using reference codes of constitutive elements that perform the operation, and XY coordinates indicating their positions.

For example, an imaging region of the sample 101 captured by the imaging element 106 is expressed as 'imaging region (101, X, Y)'. The detection region detected by the spectrum detector 301 is expressed as 'detection region (301, X, Y)', the detection region detected by the spectrum detector 302 is expressed as 'detection region (302, X, Y)', the detection region detected by the spectrum detector 303 is expressed as 'detection region (303, X, Y)', and the detection region detected by the spectrum detector 304 is expressed as 'detection region (304, X, Y)'. The imaging operation wherein the imaging element 106 captures an image of the imaging region (101, X, Y), the detection operation wherein the spectrum detector 301 detects the detection region (301, X, Y), the detection operation wherein the spectrum detector 302 detects the detection region (302, X, Y), the detection operation wherein the spectrum detector 303 detects the detection region (303, X, Y), and the detection operation wherein the spectrum detector 304 detects the detection region (304, X, Y), are expressed as 'shot number (X, Y)'.

The image of the imaging region (101, X, Y) captured by the imaging element 106 in shot number (X, Y) is expressed as 'captured image I (106, X, Y)'. The spectrum signal obtained when the spectrum detector 301 detects the detection region (301, X, Y) is expressed as 'spectrum signal S (301, X, Y)', the spectrum signal obtained when the spectrum detector 302 detects the detection region (302, X, Y) is expressed as 'spectrum signal S (302, X, Y)', the spectrum signal obtained when the spectrum detector 303 detects the detection region (303, X, Y) is expressed as 'spectrum signal S (303, X, Y)', and the spectrum signal obtained when the spectrum detector 304 detects the detection region (304, X, Y) is expressed as 'spectrum signal S (304, X, Y)'. X is an integer expressing a position in the X-axis direction, and Y is an integer expressing a position in the Y-axis direction.

The operation of the imaging system 3 will be explained more specifically. Firstly, as shown in FIG. 9A, when the imaging system 3 starts its observation of the sample 101, in shot number (1, 1), the imaging element 106 captures an image of an imaging region (101, 1, 1) and obtains a captured image I (106, 1, 1). The spectrum detector 301 performs spectrum detection of the detection region (301, 1, 1), and obtains a spectrum signal S (301, 1, 1), the spectrum detector 302 performs spectrum detection of the detection region (302, 1, 1), and obtains a spectrum signal S (302, 1, 1), the spectrum detector 303 performs spectrum detection of the detection region (303, 1, 1), and obtains a spectrum signal S (303, 1, 1), and the spectrum detector 304 performs spectrum detection of the detection region (304, 1, 1), and obtains a spectrum signal S (304, 1, 1). The position of the stage 102 for performing shot number (1, 1) is termed 'initial stage position'.

The driving device 108 then moves the stage 102 from the initial stage position in the direction of the arrow X2, i.e. it moves the imaging region in the direction of the arrow X1. At this time, as shown in FIG. 9B, the driving device 108 moves the stage 102 by a distance of a/P. Consequently, the imaging region of the imaging element 106, and the detection regions of the spectrum detector 301, the spectrum detector 302, the spectrum detector 303, and the spectrum detector 304, move relatively by a distance of a/P in the direction of the arrow X. When shot number (2, 1) is then performed, the imaging element 106 captures an image of imaging region (101, 2, 1) and obtains an image I (106, 2, 1).

The spectrum detector 301 detects the spectrum of detection region (301, 2, 1) and obtains a spectrum signal S (301, 2, 1), the spectrum detector 302 detects the spectrum of detection region (302, 2, 1) and obtains a spectrum signal S (302, 2, 1), the spectrum detector 303 detects the spectrum of detection region (303, 2, 1) and obtains a spectrum signal S (303, 2, 1), and the spectrum detector 304 detects the spectrum of detection region (304, 2, 1) and obtains a spectrum signal S (304, 2, 1).

The region 501 shown in FIG. 9B is a region of overlap in the X-axis direction between the captured image I (106, 1, 1) and the captured image I (106, 2, 1) captured by the imaging element 106. The distance in the X-axis direction of the region of overlap of the captured images I is determined according to the difference between the length b and the distance a, and the magnification P.

The driving device 108 then moves the stage 102 from the position where it performed the shot number (2, 1) in the direction of the arrow X2 (i.e. it moves the imaging region in the direction of the arrow X1) by a further distance of a/P. Consequently, as shown in FIG. 9C, the imaging region of the imaging element 106, and the detection regions of the spectrum detectors 301 to 304 move relatively in the direction of the arrow X1 by a further distance of a/P. A shot number (3, 1) is performed, and the imaging element 106 captures an image of imaging region (101, 3, 1) to obtain a captured image (106, 3, 1).

The spectrum detector 301 detects the spectrum of detection region (301, 3, 1) and obtains a spectrum signal S (301, 3, 1), the spectrum detector 302 detects the spectrum of detection region (302, 3, 1) and obtains a spectrum signal S (302, 3, 1), the spectrum detector 303 detects the spectrum of detection region (303, 3, 1) and obtains a spectrum signal S (303, 3, 1), and the spectrum detector 304 detects the spectrum of detection region (304, 3, 1) and obtains a spectrum signal S (304, 3, 1).

In FIG. 9C, the region 801 indicated by a black circle is a region of overlap between the detection region (301, 1, 1) where the spectrum detector 301 performed spectrum detection in shot number (1, 1), and the detection region (302, 3, 1) where the spectrum detector 302 performed spectrum detection in shot number (1, 1).

Similarly, the driving device 108 sequentially moves the stage 102 in the direction of the arrow X2 (i.e. it sequentially moves the imaging region in the direction of the arrow X1) at a distance of a/P each time. As shown in FIG. 9D, following shot number (3, 1), . . . , shot number (n−1, 1), and shot number (n, 1) are sequentially performed, whereby the imaging element 106, after capturing an image of the image region (101, 3, 1), captures images of . . . , imaging region (101, n−1, 1), and imaging region (101, n, 1).

The spectrum detector 301, after detecting the detection region (301, 3, 1), detects . . . , the detection region (301, n−1, 1), and the detection region (301, n, 1); the spectrum detector 302, after detecting the detection region (302, 3, 1), detects . . . , the detection region (302, n−1, 1), and the detection region (302, n, 1); the spectrum detector 303, after detecting the detection region (303, 3, 1), detects . . . , the detection region (303, n−1, 1), and the detection region (303, n, 1); the spectrum detector 304, after detecting the detection region (304, 3, 1), detects . . . , the detection region (304, n−1, 1), and the detection region (304, n, 1); (n is an integer).

In FIG. 9D also, the regions indicated by black circles are regions of overlap between the detection regions where the spectrum detector 301 and the spectrum detector 302 performed spectrum detection. More specifically, in addition to the region 801 in FIG. 9D, there are overlap regions between the detection region (301, 2, 1) and the detection region (302, 4, 1), . . . , and between the detection region (301, n−2, 1) and the detection region (302, n, 1).

Figure 9E:
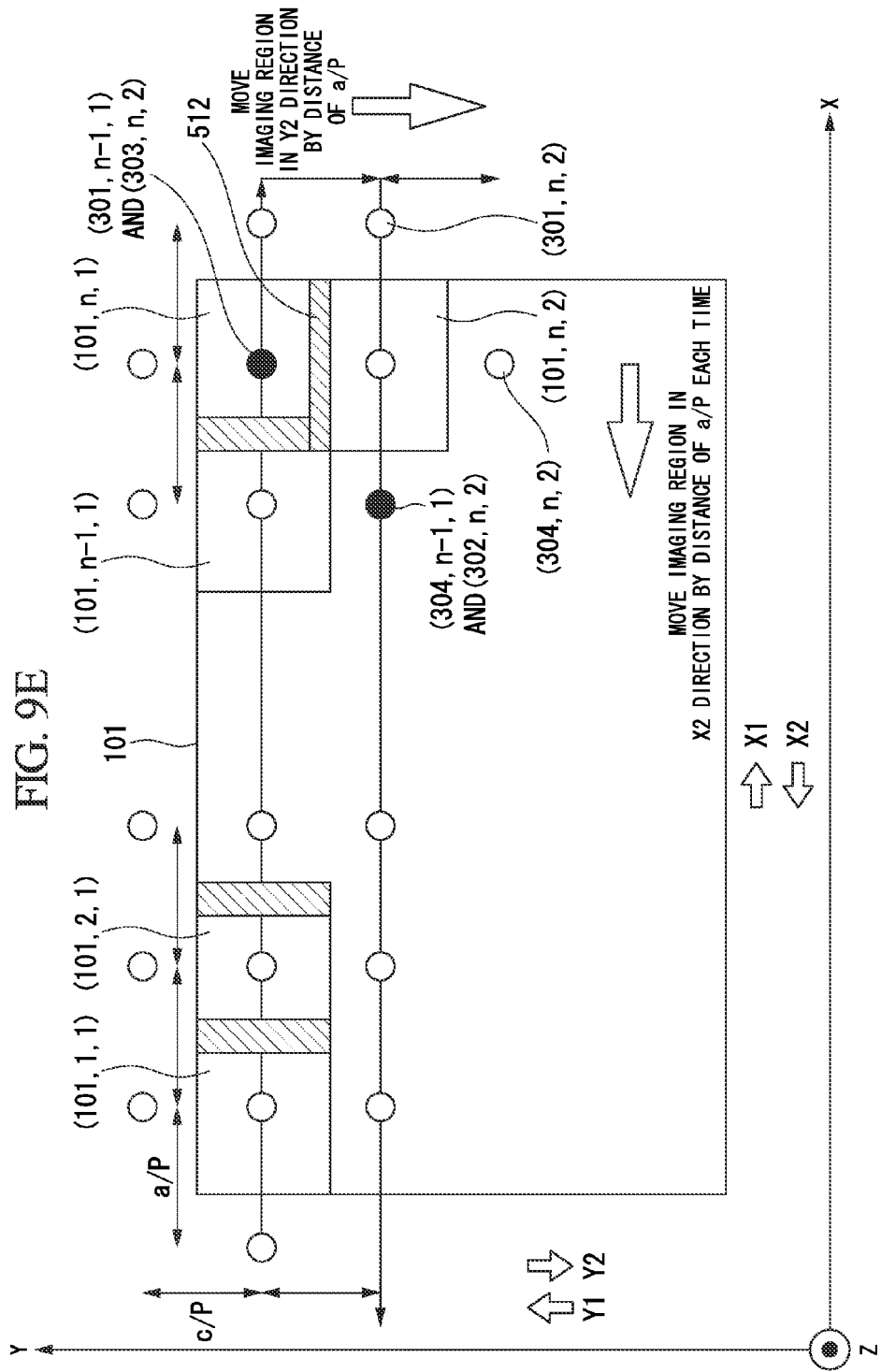

After shot number (n, 1) has been performed, the driving device 108 moves the stage 102 from the position where the shot number (n, 1) was performed in the direction of the arrow Y1, i.e. it moves the imaging region in the direction of the arrow Y2. At this time, as shown in FIG. 9E, the driving device 108 moves the stage 102 by a distance of c/P. Consequently, the imaging region of the imaging element 106 and the detection regions of the spectrum detector 301, the spectrum detector 302, the spectrum detector 303, and the spectrum detector 304 relatively move sequentially by a distance of c/P in the direction of the arrow Y2. The shot number (n, 2) is then performed, whereby the imaging element 106 captures an image of imaging region (101, n, 2) and obtains an image I (106, n, 2).

The spectrum detector 301 performs spectrum detection of detection region (301, n, 2) and obtains a spectrum signal S (301, n, 2), the spectrum detector 302 performs spectrum detection of detection region (302, n, 2) and obtains a spectrum signal S (302, n, 2), the spectrum detector 303 performs spectrum detection of detection region (303, n, 2) and obtains a spectrum signal S (303, n, 2), and the spectrum detector 304 performs spectrum detection of detection region (304, n, 2) and obtains a spectrum signal S (304, n, 2).

The region 512 shown in FIG. 9E is a region of overlap in the Y-axis direction between the captured image I (106, n, 1) and the captured image I (106, n, 2) captured by the imaging element 106. The distance in the Y-axis direction of the region of overlap of the captured images I is determined according to the difference between the length d and the distance c, and the magnification P.

In FIG. 9E, the regions indicated by black circles are regions of overlap between a detection region where the spectrum detector 301 and the spectrum detector 302 arranged in the X-axis direction performed spectrum detection and a detection region where the spectrum detector 303 and the spectrum detector 304 arranged in the Y-axis direction performed spectrum detection. More specifically, in FIG. 9E, there are overlap regions between the detection region (301, n−1, 1) and detection region (303, n, 2), and between the detection region (304, n−1, 1) and detection region (302, n, 2).

After shot number (n, 2) has been performed, the driving device 108 sequentially moves the stage 102 in the direction of the arrow X1 (i.e. it moves the imaging region in the direction of the arrow X2) at a distance of a/P each time. Consequently, the imaging region of the imaging element 106 and the detection regions of the spectrum detector 301, the spectrum detector 302, the spectrum detector 303, and the spectrum detector 304 relatively move sequentially by a distance of a/P each time in the direction of the arrow X2.

Following shot number (n, 2), . . . , shot number (n−1, 2), shot number (n−2, 2), . . . , and shot number (1, 2) are performed sequentially, whereby the imaging element 106, after capturing an image of the image region (101, n, 2), captures images of imaging region (101, n−1, 2), imaging region (101, n−2, 2), . . . , and imaging region (101, 1, 2).

The spectrum detector 301, after detecting a detection region (301, n, 2), detects a detection region (301, n−1, 2), a detection region (301, n−2, 2), . . . , and a detection region (301, 1, 2). The spectrum detector 302, after detecting a detection region (302, n, 2), detects a detection region (302, n−1, 2), a detection region (302, n−2, 2), . . . , and a detection region (302, 1, 2). The spectrum detector 303, after detecting a detection region (303, n, 2), detects a detection region (303, n−1, 2), a detection region (303, n−2, 2, . . . , and a detection region (303, 1, 2). The spectrum detector 304, after detecting a detection region (304, n, 2), detects a detection region (304, n−1, 2), a detection region (304, n−2, 2), . . . , and a detection region (304, 1, 2) (n is an integer).

In this manner, when the driving device 108 sequentially moves the imaging region of the imaging element 106, and the detection regions of the spectrum detector 301, the spectrum detector 302, the spectrum detector 303, and the spectrum detector 304, it is possible to obtain a region of overlap between the detection regions of all the spectrum detectors of the imaging system 3. In FIG. 9F, the region 801 indicated by a black circle is a region of overlap between the detection regions of the spectrum detector 301, the spectrum detector 302, the spectrum detector 303, and the spectrum detector 304, when the stage 102 is at the position for performing shot number (2, 3). More specifically, the region 802 in FIG. 9F is a region of overlap between the detection region (304, 2, 1) of the spectrum detector 304 in shot number (2, 1), the detection region (302, 3, 2) of the spectrum detector 302 in shot number (3, 2), the detection region (301, 1, 2) of the spectrum detector 301 in shot number (1, 2), and the detection region (303, 2, 3) of the spectrum detector 303 in shot number (2, 3).

As shown in FIG. 9G, while the driving device 108 is sequentially moving the imaging region and the detection regions, at each position of the stage 102, the imaging element 106 captures an image of the imaging region and the spectrum detectors 301 to 304 perform spectrum detection in their respective detection regions, thereby obtaining a captured image I and spectrum signals S at each position of the stage 102.

Lastly, the driving device 108 moves the stage 102 to a position for performing shot number (n, m), the imaging element 106 captures an image of the imaging region (101, n, m) and obtains an image I (106, n, m), the spectrum detector 301 performs spectrum detection of the detection region (301, n, m) and obtains a spectrum signal S (301, n m), the spectrum detector 302 performs spectrum detection of the detection region (302, n, m) and obtains a spectrum signal S (302, n m), the spectrum detector 303 performs spectrum detection of the detection region (303, n, m) and obtains a spectrum signal S (303, n m), and the spectrum detector 304 performs spectrum detection of the detection region (304, n, m) and obtains a spectrum signal S (304, n m) (m is an integer). The imaging system 3 thus ends its observation of the sample 101.

As described above, the imaging system 3 divides the sample 101 into a plurality of regions and captures images of them (in FIG. 9, shot number (1, 1) to shot number (n, m). The imaging system 3 can then obtain regions of overlap between the detection regions of all the spectrum detectors. For example, in the example operation of the imaging system 3 described in FIG. 9, each of the following is a region of overlap between all the spectrum detectors: detection region (304, 2, 1), detection region (301, 1, 2), detection region (302, 3, 2), and detection region (303, 2, 3), detection region (304, 3, 1), detection region (301, 2, 2), detection region (302, 4, 2), and detection region (303, 3, 3), . . . , and detection region (304, n−1, m−2), detection region (301, n−2, m−1), detection region (302, n, m−1), and detection region (303, n−1, m).

Thereafter, the spectrum signal processing unit 320 adds the spectrum signals S obtained from the regions of overlap between the detection regions of all the spectrum detectors, among spectrum signal S (301, 1, 1) to spectrum signal S (301, n, m), spectrum signal S (302, 1, 1) to spectrum signal S (302, n, m), spectrum signal S (303, 1, 1) to spectrum signal S (303, n, m), and spectrum signal S (304, 1, 1) to spectrum signal S (304, n, m), for each detection region.

For example, in the example operation of the imaging system 3 shown in FIG. 9, the spectrum signal processing unit 320 adds each of: spectrum signal S (304, 2, 1), spectrum signal (301, 1, 2), spectrum signal (302, 3, 2), and spectrum signal (303, 2, 3), spectrum signal S (304, 3, 1), spectrum signal (301, 2, 2), spectrum signal (302, 4, 2), and spectrum signal (303, 3, 3), . . . , spectrum signal S (304, j, k), spectrum signal (301, j−1, k+1), spectrum signal (302, j+1, k+1), and spectrum signal (303, j, k+2), . . . , spectrum signal S (304, n−1, m−2), spectrum signal (301, n−2, m−1), spectrum signal (302, n, m−1), and spectrum signal (303, n−1, m), to create added spectrum signals SP (j and k are integers). It then outputs the created added spectrum signal SP of each detection region to the correcting unit 311.

The correcting unit 311 then synthesizes the images (106, 1, 1) to (106, n, m) captured by the imaging element 106 to create an image of the whole sample 101. On the basis of spectrum information contained in the added spectrum signals SP inputted from the spectrum signal processing unit 320, the correcting unit 311 performs a correction process to the image of the whole sample 101 that was created, and outputs it as a virtual slide of the sample 101 as observed by the imaging system 3. Instead of using all the spectrum signals S inputted from the spectrum signal processing unit 320, the correcting unit 311 can perform the correction process using a predetermined number of added spectrum signals SP, or added spectrum signals SP obtained by detection at predetermined positions.

As described above, in the imaging system 3 in accordance with the third preferred embodiment of the present invention, the imaging element 106, the spectrum detector 301, the spectrum detector 302, the spectrum detector 303, and the spectrum detector 304 are arranged such as to be adjacent to each other in the same focal plane, whereby, as in the imaging system 1 shown in FIG. 1 and the imaging system 2 shown in FIG. 4, all of the transmission light of the sample 101 that passed through the image-forming optical system 5 is irradiated to the imaging element and each of the spectrum detectors. This increases the amount of light of the sample 101 detected by the imaging element 106 and the spectrum detectors.

Furthermore, in the imaging system 3 in accordance with the third preferred embodiment of the present invention, the spectrum signal processing unit 320 adds the spectrum signals S obtained from each of the regions of overlap between the detection regions of the spectrum detectors 301 to 304. The added spectrum signal SP obtained by the spectrum signal processing unit 320 has an enhanced signal quantity (S) that is four times that of a spectrum signal S obtained by spectrum detection from any one of the spectrum detectors 301 to 304, and a noise quantity (N) that is twice that of this spectrum signal S. Therefore, the SNR of the added spectrum signal SP is enhanced to twice that of this spectrum signal S.

In the imaging system 3 in accordance with the third preferred embodiment of the present invention, on the basis of spectrum information contained in the plurality of added spectrum signals SP with enhanced SNR, the correcting unit 311 can correct the image of the whole sample 101 captured by the imaging element 106. An image of the whole sample 101 with enhanced color reproduction characteristic can be thereby obtained.

Fourth Preferred Embodiment

An imaging system in accordance with a fourth preferred embodiment of the present invention will be described. The imaging system in accordance with the fourth preferred embodiment of the present invention is configured by providing a plurality of spectrum detectors to the imaging system 1 shown in FIG. 1. On the basis of spectrum information contained in the spectrum signals output from plurality of spectrum detectors, the color reproduction characteristic of the virtual slide is corrected, and the corrected virtual slide is output as a virtual slide in the imaging system in accordance with the fourth preferred embodiment of the present invention. Therefore, other than the fact that spectrum signals from a plurality of spectrum detectors are inputted to the correcting unit 109 shown in FIG. 1, the configuration and operation in accordance with the fourth preferred embodiment of the present invention are the same as those of the imaging system 1 shown in FIG. 1, and will not be repetitiously described. In the following description, the imaging system in accordance with the fourth preferred embodiment of the present invention is referred to as imaging system 4.

One example of the positional relationship between the imaging element 106 and the plurality of spectrum detectors in the imaging system 4 in accordance with the fourth preferred embodiment of the present invention will be described. FIG. 10 is a schematic diagram illustrating an example of the positional relationship between the imaging element and a plurality of spectrum detectors in a focal plane of the imaging system 4 in accordance with the fourth preferred embodiment of the present invention. FIG. 10 shows an imaging system 4 including two spectrum detectors (spectrum detector 491 and spectrum detector 492).

As shown in FIG. 10, in the imaging system 4, the imaging element 106 and the spectrum detectors 491 and 492 are arranged adjacent to each other in a focal plane 901, which is formed by the image-forming optical system 105 of the imaging system 4. FIG. 10 shows the focal plane 901, the position of the imaging element 106, the position of the spectrum detector 491, and the position of the spectrum detector 492. FIG. 10 also shows a region in the focal plane 901 where the imaging element 106 captures an image, a region where the spectrum detector 491 detects a spectrum, and a region where the spectrum detector 492 detects a spectrum.

As described above, in the imaging system 4 in accordance with the fourth preferred embodiment of the present invention, the imaging element 106 and the plurality of spectrum detectors (two in FIG. 10) are arranged such that they are adjacent to each other within the same focal plane 901, whereby, as in the imaging system 1 shown in FIG. 1, all of the transmission light from the sample 101 that passed through the image-forming optical system 105 is irradiated to the imaging element 106 and the plurality of spectrum detectors. This increases the quantity of transmission light of the sample 101 detected by the imaging element 106 and each of the spectrum detectors. The output of the spectrum signal S from each spectrum detector then increases, and so does the SNR of the spectrum signal S.

In the imaging system 4 in accordance with the fourth preferred embodiment of the present invention, since the plurality of spectrum detectors are arranged in the same focal plane 901, they can detect the spectra of different detection regions of the sample 101 and obtain spectrum information from a greater number of spectrum signals. In the imaging system 4 in accordance with the fourth preferred embodiment of the present invention, the image of the whole sample 101 captured by the imaging element 106 can be corrected on the basis of spectrum information contained in spectrum signals obtained from a plurality of regions. Therefore, an image of the whole sample 101 with enhanced color reproduction characteristic can be obtained.

In the imaging system 4 in accordance with the fourth preferred embodiment of the present invention, while the example of FIG. 10 includes two spectrum detectors (spectrum detectors 491 and 492), the number and arrangement of the spectrum detectors in the imaging system 4 are not limited to those shown by way of example in FIG. 10. For example, the number of spectrum detectors can be increased.

Fifth Preferred Embodiment

An imaging system in accordance with a fifth preferred embodiment of the present invention will be described. The imaging system in accordance with the fifth preferred embodiment of the present invention is configured by providing a further plurality of spectrum detectors to the imaging system 2 shown in FIG. 4. Specifically, in the imaging system 2, if the spectrum detector 301 and the spectrum detector 302 arranged in the X-axis direction in FIG. 5 are treated as one group, the imaging system in accordance with the fifth preferred embodiment of the present invention is configured by providing a plurality of groups of spectrum detectors arranged in the X-axis direction. On the basis of spectrum information contained in spectrum signals output from the plurality of spectrum detectors, the color reproduction characteristic of the virtual slide is corrected, and the corrected slide is output as a virtual slide in the imaging system in accordance with the fifth preferred embodiment of the present invention. In the following description, an imaging system in accordance with the fifth preferred embodiment of the present invention is termed imaging system 5.

An example of the positional relationship between the imaging element 106 and the plurality of spectrum detectors in the imaging system 5 in accordance with the fifth preferred embodiment of the present invention will be described. FIG. 11 is a schematic diagram illustrating an example of the positional relationship between an imaging element and a plurality of spectrum detectors in a focal plane of the imaging system 5 in accordance with the fifth preferred embodiment of the present invention. In the example of FIG. 11, the imaging system 5 includes two groups of spectrum detectors (one group including spectrum detectors 531 and 532, and another group including spectrum detectors 533 and 534).

As shown in FIG. 11, in the imaging system 5, an imaging element 106 and the two groups of spectrum detectors are arranged such that they adjoin each other in a focal plane 1001 formed by the image-forming optical system 105 of the imaging system 5. FIG. 11 shows the focal plane 1001, the position of the imaging element 106, and the positions of the plurality of spectrum detectors. FIG. 11 also shows the regions in the focal plane 1001 that the imaging element 106 captures images of, and the regions that the spectrum detectors detect.

The positions of the spectrum detectors 531 and 533 in the X-axis direction are similar to that of the spectrum detector 301 in the imaging system 2 shown in FIG. 5, and the positions of the spectrum detectors 532 and 534 in the X-axis direction are similar to that of the spectrum detector 302 in the imaging system 2 shown in FIG. 5. For that reason, they will not be explained in detail.

Figure 12:
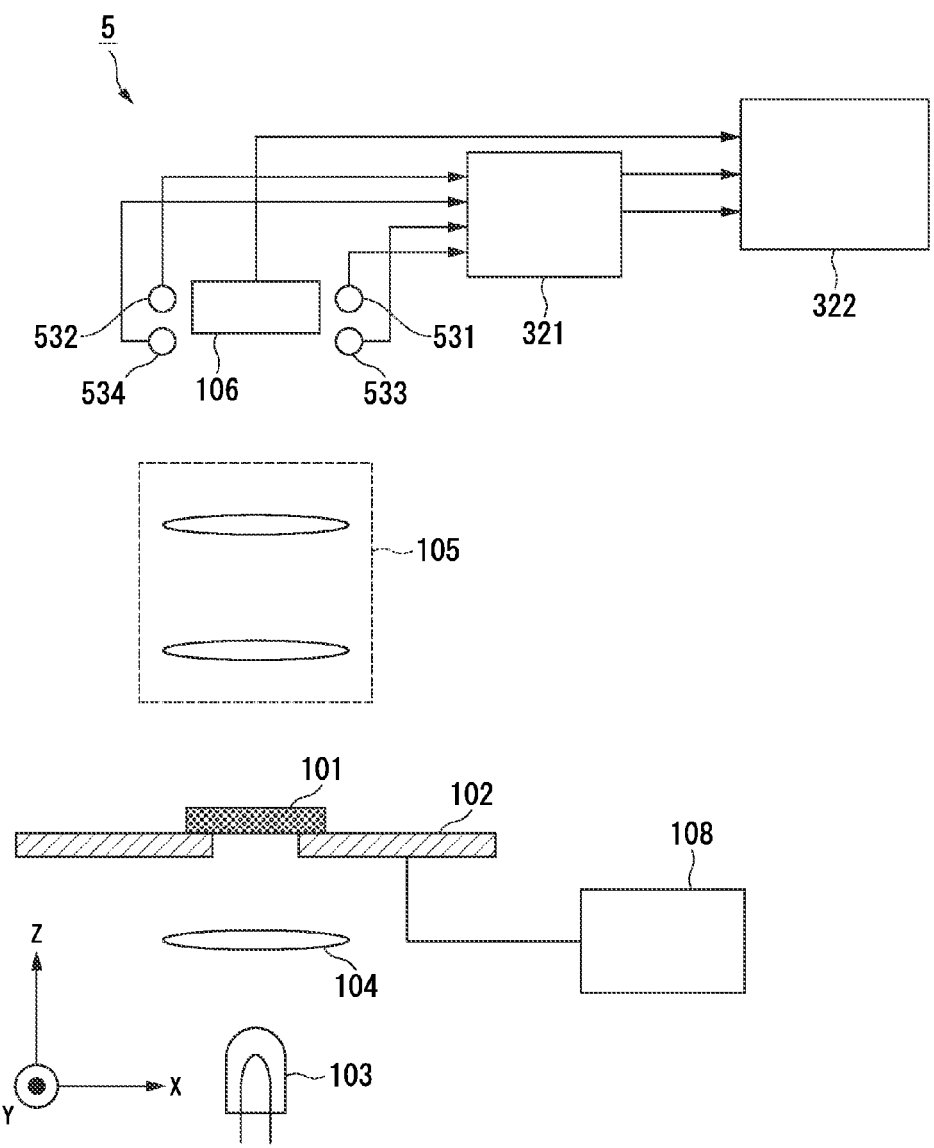
FIG. 12 is diagram illustrating a schematic configuration of the imaging system in accordance with the fifth preferred embodiment of the present invention.

The configuration of the imaging system 5 in accordance with the fifth preferred embodiment of the present invention will be described. FIG. 12 is diagram illustrating a schematic configuration of the imaging system 5 in accordance with the fifth preferred embodiment of the present invention. The imaging system 5 shown in FIG. 12 includes a stage 102, a transmission light source 103, a condenser lens 104, an image-forming optical system 105, an imaging element 106, a spectrum detector 531, a spectrum detector 532, a spectrum detector 533, a spectrum detector 534, a driving device 108, a spectrum signal processing unit 321, and a correcting unit 322. The sample 101 shown in FIG. 12 is a sample to be observed by the imaging system 5 of the fifth embodiment, and is not a constituent element of the imaging system 5.

As described above, the imaging system in accordance with the fifth preferred embodiment of the present invention is configured by providing two groups of spectrum detectors (one group including spectrum detectors 531 and 532, and another group including spectrum detectors 533 and 534) to the imaging system 2 shown in FIG. 4. In this configuration, the spectrum signal processing unit 321 is provided instead of the spectrum signal processing unit 310 in the imaging system 2 shown in FIG. 4, and the correcting unit 322 is provided instead of the correcting unit 311. The operation of the other constitutive elements is roughly the same as that of the constitutive elements of the imaging system 2 shown in FIG. 4. Therefore, in the imaging system 5, constitutive elements which have similar operations to those in the imaging system 2 shown in FIG. 4 are designated with the same reference numerals, and only operational differences will be described.

Like the imaging system 2 shown in FIG. 4, the imaging system 5 divides the sample 101 to be observed into a plurality of regions and captures images of them; it then pastes the divided images (digital images) together to create a single digital image (virtual slide) of the whole sample with corrected color reproduction characteristic.

In the imaging system 5, the two groups of spectrum detectors (one group including spectrum detectors 531 and 532, and another group including spectrum detectors 533 and 534) are arranged in the same focal plane as the imaging element 106, and detect spectra at a plurality of points in the virtual slide. The imaging system 5 adds the spectrum signals output from each group of spectrum detectors, and, on the basis of spectrum information contained in the added spectrum signal, corrects the color reproduction characteristic of the virtual slide.

The movement of the stage 102 required to add the spectrum signals (i.e. the driving of the stage 102 by the driving device 108) is the same as that of the imaging system 2 in FIG. 4, and will not be explained further.

In the imaging system 5, the process of correcting the image of the whole sample 101, performed at each position of the stage 102 on the basis of a captured image I and spectrum signals I, obtained by the imaging element 106 that captures an image of the imaging region, and by the spectrum detector 531, the spectrum detector 532, the spectrum detector 533, and the spectrum detector 534 that detect the detection regions, differs from that of the imaging system 2 shown in FIG. 4. However, the creation of the image of the whole sample 101 by the correcting unit 322 is similar to that of the imaging system 2 shown in FIG. 4, and will not be explained further.

In the imaging system 5, in one imaging region there are two detection regions corresponding to each group of spectrum detectors. Consequently, there are two regions where spectra are detected by a plurality of overlapping spectrum detectors. For example, in the imaging system 2 shown in FIG. 4, there is one detection region where the spectrum detector 301 and the spectrum detector 302 overlap, as in region 502 shown in FIG. 6C. In the imaging system 5, for example, in the state shown in FIG. 6C, there are two regions where detection is performed in overlap: a region where the spectrum detectors 531 and 532 perform detection in overlap, and a region where the spectrum detectors 533 and 534 perform detection in overlap.

More specifically, for example, in the state shown in FIG. 6C, there is an overlap region between a detection region (531, 1, 1) detected by the spectrum detector 531 in shot number (1, 1), and a detection region (532, 3, 1) detected by the spectrum detector 532 in shot number (3, 1). There is another overlap region between a detection region (533, 1, 1) detected by the spectrum detector 533 in shot number (1, 1), and a detection region (534, 3, 1) detected by the spectrum detector 534 in shot number (3, 1).

In the imaging system 5, for each group of spectrum detectors, the spectrum signal processing unit 321 adds the spectrum signals obtained by spectrum detection in the overlapping detection region, and thereby creates an added spectrum signal SP for each group of spectrum detectors. More specifically, the spectrum signal processing unit 321 adds the spectrum signals obtained from the regions of overlap in the group including the spectrum detectors 531 and 532, to create an added spectrum signal SP (hereinafter 'added spectrum signal SP1'). It also adds the spectrum signals obtained from the regions of overlap in the group including the spectrum detectors 533 and 534, to create another added spectrum signal SP (hereinafter 'added spectrum signal SP2').

On the basis of spectrum information contained the added spectrum signal SP1 and the added spectrum signal SP2 inputted from the spectrum signal processing unit 321, the correcting unit 322 corrects the captured image inputted from the imaging element 106, and outputs it as a virtual slide in the imaging system 5.

As described above, in the imaging system 5 in accordance with the fifth preferred embodiment of the present invention, the imaging element 106 and the plurality of spectrum detectors (two groups of spectrum detectors in FIG. 11) are arranged such that they are adjacent to each other within the same focal plane 1001, whereby, as in the imaging system 1 shown in FIG. 1, all of the transmission light from the sample 101 that passed through the image-forming optical system 105 is irradiated to the imaging element 106 and the plurality of spectrum detectors. This increases the quantity of transmission light of the sample 101 detected by the imaging element 106 and each of the spectrum detectors. The output of the spectrum signal S from each spectrum detector then increases, and so does the SNR of the spectrum signal S.

In the imaging system 5 in accordance with the fifth preferred embodiment of the present invention, the spectrum signal processing unit 321 adds the spectrum signals S obtained from the regions of overlap between the detection regions in each group of spectrum detectors. Each of the added spectrum signals SP1 and SP2 added by the spectrum signal processing unit 321 has an enhanced signal quantity (S) that is twice that of a spectrum signal S obtained by spectrum detection using one spectrum detector, and a noise quantity (N) that is the square root of twice. Therefore, the SNR of the added spectrum signals SP1 and SP2 is enhanced to the square root of twice.

In the imaging system 5 in accordance with the fifth preferred embodiment of the present invention, since the plurality of spectrum detectors are arranged in the same focal plane 1001, they can detect the spectra of different detection regions of the sample 101 and obtain spectrum information from a greater number of spectrum signals. In the imaging system 5 in accordance with the fifth preferred embodiment of the present invention, the image of the whole sample 101 captured by the imaging element 106 can be corrected on the basis of spectrum information contained in added spectrum signals SP obtained from a plurality of regions. Therefore, an image of the whole sample 101 with further enhanced color reproduction characteristic can be obtained.

In the example shown in FIG. 11, the imaging system 5 in accordance with the fifth preferred embodiment of the present invention includes two groups of spectrum detectors (one group including spectrum detectors 531 and 532, and another group including spectrum detectors 533 and 534). However, the arrangement and number of the groups of spectrum detectors in the imaging system 5 is not limited to the example shown in FIG. 11. For example, more groups of spectrum detectors can be added in the X-axis direction, and in the Y-axis direction.

As described above, according to the preferred embodiments of the present invention, the imaging element and a plurality of the spectrum detectors are arranged such that they are adjacent to each other within the same focal plane, whereby all of the transmission light from the sample that passed through the image-forming optical system is irradiated to the imaging element and the plurality of spectrum detectors. This can increase the quantity of transmission light of the sample detected by the imaging element and each of the spectrum detectors, and can realize an imaging system wherein the spectrum detectors output spectrum signals with a high SNR.

According to the preferred embodiments of the present invention, a plurality of spectrum detectors are arranged in the same irradiation face, and the imaging element divides the sample into a plurality of regions and captures images of them. At that time, the stage is moved such that the detection regions in which the spectrum detectors perform spectrum detection overlap, enabling a plurality of spectrum detectors to detect the spectrum of the same detection region. This can obtain a plurality of spectrum signals of the same detection region. By adding the plurality of signals thereby obtained, it is possible to realize an imaging system that can obtain spectrum signals with an even higher SNR.

According to the preferred embodiments of the present invention, a plurality of spectrum detectors that perform spectrum detection of different detection region are arranged in the same focal plane, whereby the spectrum of a different region of the sample can be detected every time the imaging element divides the sample and captures an image. Therefore, it is possible to realize an imaging system that can obtain a greater number of spectrum signals.

In the preferred embodiments of the present invention, the image of the whole sample can be corrected based on spectrum information in a spectrum signal with a high SNR. This makes it possible to realize an imaging system that can obtain an image of the whole sample with enhanced color reproduction.

While in the preferred embodiments of the present invention, the driving device 108 first moves the stage 102 whereon the sample 101 is arranged in the X-axis direction, and then moves it in the Y-axis direction, the stage 102 can be moved in the Y-axis direction first instead. While in this embodiment, for example, the detection regions of the spectrum detectors overlap for the first time when performing shot number (3, 1) in FIG. 6C and FIG. 9C, the number of the shot in which the spectrum detectors overlap for the first time is not limited to the one in this embodiment. For example, the distance that the driving device 108 moves the stage 102 can be shortened, and the operation can be controlled such that detection regions of the spectrum detectors overlap for the first time after a certain number of shots have been repeated.

While in the preferred embodiments of the present invention, the example described is an imaging system using a transmission light source, the light source used for observing the sample is not limited to the one in these preferred embodiments. For example, it is also possible to use an incident light source, a reflected light source, or the like.

While in the preferred embodiments of the present invention, the spectrum detectors are arranged in a focal plane, the actual arrangement of the spectrum detectors is not limited to this one. For example, light from a detection region of a spectrum detector in the focal plane can be transmitted through an optical fiber or the like, and a spectrum detector installed outside can detect the spectrum of the transmitted light of the focal plane.

While in the preferred embodiments of the present invention, the example described is one where the partition of the imaging regions matches the area around the sample 101, there may be cases where the partition of the imaging regions does not match. In such cases, although no image of the sample is captured in imaging regions around the sample, this issue can be dealt with ensuring that a spectrum signal that was not obtained from detection inside the sample 101 is not used in the correction process.

While each of the preferred embodiments of the present invention is provided with the minimum number of spectrum detectors required for the imaging system to operate, the number of spectrum detectors provided is not limited to those described in these preferred embodiments. It is acceptable to increase the number of spectrum detectors, and the number of groups of spectrum detectors. In that case, if the driving device moves the stage such that there is overlap between the detection regions of the spectrum detectors in the imaging system, spectrum signals with an even higher SNR can be obtained in the regions of overlap.

While preferred embodiments of the present invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging system comprising:
a stage on where a sample to be observed is arranged;
an optical system that forms an image of light irradiated onto the sample in a predetermined focal plane;
an imaging element that includes a pixel array in which a plurality of pixels are arranged in a two-dimensional matrix, each of the pixels detecting at least a part of the light of the image of the sample formed in the focal plane, the imaging element obtaining the image of the sample corresponding to the light detected by the pixel array;
a spectrum detecting unit that is arranged such as to be adjacent to the pixel array, the spectrum detecting unit detecting a spectrum of the light in the focal plane to output spectrum information; and
a correcting unit that corrects the image of the sample obtained by the imaging element based on the spectrum information output from the spectrum detecting unit, wherein
the stage moves in a direction perpendicular to an optical axis of the optical system that the light irradiated to the sample is incident to,
the spectrum detecting unit comprises a first spectrum detector and a second spectrum detector arranged at positions that are symmetrical to a first direction that is parallel or orthogonal to a row direction or a column direction of the pixel array, taking a predetermined position in the pixel array as a reference,
the first spectrum detector detects the spectrum of the light in a first observation region of the sample corresponding to a first region in the focal plane, and outputs first spectrum information, the second spectrum detector detects the spectrum of the light in a second observation region of the sample corresponding to a second region in the focal plane, and outputs second spectrum information, and if there is at least a partial overlap between the first observation region, which corresponds to the first region detected by the first spectrum detector when the stage is at a first position, and the second observation region, which corresponds to the second region detected by the second spectrum detector when the stage is at a second position, the correcting unit corrects the image of the sample obtained by the imaging element based on the first spectrum information, which has been obtained when the first spectrum detector has detected the spectrum of the light of an overlapping observation region, and the second spectrum information, which has been obtained when the second spectrum detector has detected the spectrum of the light of the overlapping observation region.

2. The imaging system according to claim 1, wherein the spectrum detecting unit further comprises a first spectrum detector and a second spectrum detector arranged at positions that are symmetrical to a second direction that is parallel or orthogonal to the first direction with respect to the reference, the third spectrum detector detects the spectrum of the light in a third observation region of the sample corresponding to a third region in the focal plane, and outputs third spectrum information, the fourth spectrum detector detects the spectrum of the light in a fourth observation region of the sample corresponding to a fourth region in the focal plane, and outputs fourth spectrum information, and if there is at least a partial overlap between at least one of the third observation region, which corresponds to the third region detected by the third spectrum detector when the stage is at a third position, the fourth observation region, which corresponds to the fourth region detected by the fourth spectrum detector when the stage is at a fourth position, and the overlapping observation region, the correcting unit corrects the image of the sample obtained by the imaging element based on at least one of the third spectrum information, which has been obtained when the third spectrum detector has detected the spectrum of light of the overlapping observation region, and the fourth spectrum information, which has been obtained when the fourth spectrum detector has detected the spectrum of light of the overlapping observation region, the first spectrum information, which has been obtained when the first spectrum detector has detected the spectrum of light of the overlapping observation region, and the second spectrum information, which has been obtained when the second spectrum detector has detected the spectrum of light of the overlapping observation region.

3. The imaging system according to claim 1, wherein the spectrum detecting unit comprises a plurality of spectrum detectors that detect the spectrum of the light in the focal plane, each of the plurality of spectrum detectors detects the spectrum of the light in a different region in the focal plane, and outputs the spectrum information corresponding to the spectrum of the light that has been detected, and the correcting unit corrects the image of the sample, which has been obtained by the imaging element, based on the spectrum information output from each of the spectrum detectors of the spectrum detecting unit.

4. The imaging system according to claim 1, wherein the correcting unit comprises an adding unit that adds a plurality of pieces of the spectrum information, which has been detected by a plurality of spectrum detectors in the overlapping region, and the correcting unit corrects the image of the sample, which has been obtained by the imaging element, based on the spectrum information added by the adding unit.

\* \* \* \* \*